(12) United States Patent
Hosoi et al.

(10) Patent No.: US 10,795,321 B2
(45) Date of Patent: Oct. 6, 2020

(54) WRIST WATCH WITH HEARING FUNCTION

(71) Applicant: Finewell Co., Ltd., Osaka (JP)

(72) Inventors: Hiroshi Hosoi, Osaka (JP); Yoji Hosoi, Osaka (JP); Masahide Tanaka, Osaka (JP)

(73) Assignee: Finewell Co., Ltd., Osaka (JP)

(*) Notice: Subject to any disclaimer, the term of this patent is extended or adjusted under 35 U.S.C. 154(b) by 0 days.

(21) Appl. No.: 15/759,863

(22) PCT Filed: Sep. 8, 2016

(86) PCT No.: PCT/JP2016/076494
§ 371 (c)(1),
(2) Date: Mar. 14, 2018

(87) PCT Pub. No.: WO2017/047501
PCT Pub. Date: Mar. 23, 2017

(65) Prior Publication Data
US 2018/0259915 A1    Sep. 13, 2018

(30) Foreign Application Priority Data
Sep. 16, 2015 (JP) .................................. 2015-182592

(51) Int. Cl.
*G04G 21/02*       (2010.01)
*G04G 21/06*       (2010.01)
(Continued)

(52) U.S. Cl.
CPC ............. *G04G 21/06* (2013.01); *G04G 21/02* (2013.01); *G04G 21/04* (2013.01); *H04B 1/385* (2013.01);
(Continued)

(58) Field of Classification Search
CPC ........ G04G 21/02; G04G 21/04; G04G 21/06; G04G 21/025; H04R 1/028; H04R 2420/07; H04B 1/385; H04M 1/03
See application file for complete search history.

(56) References Cited

U.S. PATENT DOCUMENTS 2,045,404 A   6/1936   Nicholides
4,351,166 A   9/1982   Belin
(Continued)

FOREIGN PATENT DOCUMENTS

CN    2198618      5/1995
CN    1110857 A    10/1995
(Continued)

OTHER PUBLICATIONS

Japan Patent Office, International Search Report for PCT/JP2017/000787 dated Mar. 28, 2017 (with English translation).
(Continued)

*Primary Examiner* — Sean Kayes
(74) *Attorney, Agent, or Firm* — Fish & Richardson P.C.

(57) ABSTRACT

Provided is a wristwatch provided with a display unit with which the top and bottom of a display can be inverted when being observed, and vibration transferring units for cartilage conduction provided respectively in the vicinity of the distal end of the radius and in a part in contact with the distal end of the ulna when being worn. The wristwatch is provided with an operating portion which is located at the back of the hand when being worn. The orientation whereby the top and bottom of the display unit are in an upright condition is determined on the basis of an acceleration detected by an acceleration detecting unit, and a determination is performed on the basis of a mean value of gravitational acceleration to determine whether the wristwatch is being worn with the operating portion facing up or down.

5 Claims, 19 Drawing Sheets

(51) Int. Cl.
*H04R 1/02* (2006.01)
*G04G 21/04* (2013.01)
*H04B 1/3827* (2015.01)
*H04M 1/725* (2006.01)
*H04M 1/03* (2006.01)
*H04M 1/02* (2006.01)

(52) U.S. Cl.
CPC .......... *H04M 1/7253* (2013.01); *H04R 1/028* (2013.01); *H04M 1/0266* (2013.01); *H04M 1/03* (2013.01); *H04R 2420/07* (2013.01)

(56) References Cited

U.S. PATENT DOCUMENTS

| | | |
|---|---|---|
| 5,125,032 A | 6/1992 | Meister |
| RE34,525 E | 2/1994 | Lazzaroni |
| 5,295,193 A | 3/1994 | Ono |
| 5,323,468 A | 6/1994 | Bottesch |
| 5,396,563 A | 3/1995 | Yoshimi |
| 5,682,173 A | 10/1997 | Holakovszky et al. |
| 5,686,882 A * | 11/1997 | Giani .................. G04G 13/028 340/407.1 |
| 5,687,244 A | 11/1997 | Untersander |
| 5,956,682 A | 9/1999 | Loudermilk |
| 5,986,813 A | 11/1999 | Saikawa |
| 6,028,556 A | 2/2000 | Shiraki |
| 6,380,923 B1 | 4/2002 | Fukumoto et al. |
| 6,456,721 B1 | 9/2002 | Fukuda |
| 6,463,157 B1 | 10/2002 | May |
| 6,483,917 B1 | 11/2002 | Kang et al. |
| 6,603,863 B1 | 8/2003 | Nagayoshi |
| 6,754,359 B1 | 6/2004 | Svean |
| 6,825,830 B1 | 11/2004 | Kanesaka et al. |
| 6,912,287 B1 | 6/2005 | Fukumoto et al. |
| 6,950,126 B1 | 9/2005 | Homma et al. |
| 6,957,049 B1 | 10/2005 | Takeda |
| 7,231,235 B2 | 6/2007 | Harrold |
| 7,257,372 B2 | 8/2007 | Kaltenbach |
| 7,437,122 B2 | 10/2008 | Choi |
| 7,442,164 B2 | 10/2008 | Berrang et al. |
| 7,555,136 B2 | 6/2009 | Wang |
| 7,616,771 B2 | 11/2009 | Lenhardt |
| 7,783,034 B2 | 8/2010 | Manne |
| 7,822,215 B2 | 10/2010 | Carazo |
| 7,890,147 B2 | 2/2011 | Tanada |
| 8,433,080 B2 | 4/2013 | Rader |
| 8,521,239 B2 | 8/2013 | Hosoi et al. |
| 8,526,646 B2 | 9/2013 | Boesen |
| 8,532,322 B2 | 9/2013 | Parker |
| 8,886,263 B2 | 11/2014 | Hosoi et al. |
| 8,918,149 B2 | 12/2014 | Hosoi et al. |
| 9,020,168 B2 | 4/2015 | Karkkainen |
| 9,020,170 B2 | 4/2015 | Hosoi et al. |
| 9,107,466 B2 | 8/2015 | Hoying |
| 9,313,306 B2 | 4/2016 | Hosoi et al. |
| 9,351,090 B2 | 5/2016 | Tachibana |
| 9,367,087 B1 * | 6/2016 | Townsend .............. A61B 90/98 |
| 9,471,102 B2 * | 10/2016 | Townsend .............. G06F 1/163 |
| 9,552,707 B1 * | 1/2017 | Bala ........................ G08B 6/00 |
| 9,565,285 B2 | 2/2017 | Theverapperunna |
| 9,949,670 B2 | 4/2018 | Ikeda |
| 10,016,161 B2 * | 7/2018 | Townsend ............. G06F 1/1679 |
| 10,079,925 B2 | 9/2018 | Hosoi |
| 2001/0011951 A1 | 8/2001 | Kimata et al. |
| 2001/0026626 A1 | 10/2001 | Athanas |
| 2002/0001381 A1 | 1/2002 | Mori |
| 2002/0003604 A1 | 1/2002 | Yaguchi |
| 2002/0012441 A1 | 1/2002 | Matsunaga et al. |
| 2002/0068995 A1 | 6/2002 | Yoshida |
| 2002/0114214 A1 | 8/2002 | Hansen et al. |
| 2002/0115478 A1 | 8/2002 | Fujisawa et al. |
| 2002/0149561 A1 | 10/2002 | Fukumoto et al. |
| 2002/0183014 A1 | 12/2002 | Takeda et al. |
| 2003/0064758 A1 | 4/2003 | Mizuta et al. |
| 2003/0108209 A1 | 6/2003 | McIntosh |
| 2003/0118197 A1 | 6/2003 | Nagayasu et al. |
| 2003/0119566 A1 | 6/2003 | Chen |
| 2003/0174856 A1 | 9/2003 | Johannsen et al. |
| 2004/0013279 A1 | 1/2004 | Takeda |
| 2004/0048633 A1 | 3/2004 | Sato et al. |
| 2004/0086149 A1 | 5/2004 | Johannsen et al. |
| 2004/0087346 A1 | 5/2004 | Johannsen et al. |
| 2004/0105566 A1 | 6/2004 | Matsunaga et al. |
| 2004/0131211 A1 | 7/2004 | Miyata et al. |
| 2004/0132509 A1 | 7/2004 | Glezerman |
| 2004/0137963 A1 | 7/2004 | Barras et al. |
| 2004/0189151 A1 | 9/2004 | Athanas |
| 2004/0207542 A1 | 10/2004 | Chang et al. |
| 2004/0259513 A1 | 12/2004 | Park |
| 2005/0031152 A1 | 2/2005 | Hansen et al. |
| 2005/0046790 A1 | 3/2005 | Jannard et al. |
| 2005/0088530 A1 | 4/2005 | Homma et al. |
| 2005/0129257 A1 | 6/2005 | Tamura |
| 2005/0160270 A1 | 7/2005 | Goldberg |
| 2005/0176459 A1 | 8/2005 | Fukuda |
| 2005/0184875 A1 | 8/2005 | Schmandt et al. |
| 2005/0185813 A1 | 8/2005 | Sinclair et al. |
| 2005/0207599 A1 | 9/2005 | Fukumoto et al. |
| 2005/0213432 A1 | 9/2005 | Hoshuyama |
| 2005/0232436 A1 | 10/2005 | Nagayasu et al. |
| 2005/0237685 A1 | 10/2005 | Miyata |
| 2005/0244020 A1 | 11/2005 | Nakajima et al. |
| 2005/0260969 A1 | 11/2005 | Nagata et al. |
| 2005/0275714 A1 | 12/2005 | Ishikawa et al. |
| 2005/0276164 A1 * | 12/2005 | Amron .................. G04C 3/002 368/82 |
| 2005/0286734 A1 | 12/2005 | Wang |
| 2006/0079291 A1 | 4/2006 | Granovetter et al. |
| 2006/0089522 A1 | 4/2006 | Rastatter et al. |
| 2006/0093161 A1 | 5/2006 | Falcon |
| 2006/0094464 A1 | 5/2006 | Kyou et al. |
| 2006/0113932 A1 | 6/2006 | Mori et al. |
| 2006/0120546 A1 | 6/2006 | Tanaka et al. |
| 2006/0121960 A1 | 6/2006 | Wang |
| 2006/0140439 A1 | 6/2006 | Nakagawa |
| 2006/0158064 A1 | 7/2006 | Asakawa et al. |
| 2006/0159297 A1 | 7/2006 | Wirola et al. |
| 2006/0171107 A1 | 8/2006 | Yamamoto et al. |
| 2006/0215873 A1 | 9/2006 | Hansen et al. |
| 2006/0216022 A1 | 9/2006 | Lee et al. |
| 2006/0227984 A1 | 10/2006 | Sinclair |
| 2006/0262951 A1 | 11/2006 | Jun |
| 2006/0286998 A1 | 12/2006 | Fukuda |
| 2007/0003098 A1 | 1/2007 | Martenson |
| 2007/0014423 A1 | 1/2007 | Darbut et al. |
| 2007/0015467 A1 | 1/2007 | Nagayasu et al. |
| 2007/0019452 A1 | 1/2007 | Ohkubo et al. |
| 2007/0025574 A1 | 2/2007 | Azima et al. |
| 2007/0036370 A1 | 2/2007 | Granovetter et al. |
| 2007/0053530 A1 | 3/2007 | Ochiai et al. |
| 2007/0057601 A1 | 3/2007 | Kawase et al. |
| 2007/0080951 A1 | 4/2007 | Maruyama et al. |
| 2007/0081679 A1 | 4/2007 | Suzuki et al. |
| 2007/0098200 A1 | 5/2007 | Takei |
| 2007/0117594 A1 | 5/2007 | Ong |
| 2007/0160238 A1 | 7/2007 | Kobayashi |
| 2007/0160253 A1 | 7/2007 | Takei et al. |
| 2007/0249395 A1 | 10/2007 | Kondo et al. |
| 2007/0263893 A1 | 11/2007 | Kim |
| 2007/0269777 A1 | 11/2007 | Fux |
| 2007/0297637 A1 | 12/2007 | Sugiyama |
| 2008/0008344 A1 | 1/2008 | Wakabayashi et al. |
| 2008/0054862 A1 | 3/2008 | Hara |
| 2008/0092278 A1 | 4/2008 | Rogers |
| 2008/0106449 A1 | 5/2008 | Doi |
| 2008/0107290 A1 | 5/2008 | Tamura |
| 2008/0107300 A1 | 5/2008 | Chen |
| 2008/0123893 A1 | 5/2008 | Lee |
| 2008/0129703 A1 | 6/2008 | Takeshita et al. |
| 2008/0137883 A1 | 6/2008 | Araki |
| 2008/0139254 A1 | 6/2008 | Levy |
| 2008/0143512 A1 | 6/2008 | Wakisaka et al. |
| 2008/0170725 A1 | 7/2008 | Asada et al. |
| 2008/0205679 A1 | 8/2008 | Darbut et al. |

(56) References Cited

U.S. PATENT DOCUMENTS

| | | |
|---|---|---|
| 2008/0227490 A1 | 9/2008 | Homma et al. |
| 2008/0227501 A1 | 9/2008 | Joo et al. |
| 2008/0239061 A1 | 10/2008 | Cok et al. |
| 2008/0240465 A1 | 10/2008 | Shiraishi |
| 2008/0247562 A1 | 10/2008 | Nagayasu et al. |
| 2008/0267433 A1 | 10/2008 | Katou et al. |
| 2008/0297373 A1 | 12/2008 | Hayakawa et al. |
| 2008/0319250 A1 | 12/2008 | Asnes |
| 2009/0002626 A1 | 1/2009 | Wakabayashi |
| 2009/0028356 A1 | 1/2009 | Ambrose et al. |
| 2009/0069045 A1 | 3/2009 | Cheng |
| 2009/0093283 A1 | 4/2009 | Mizuta et al. |
| 2009/0129620 A1 | 5/2009 | Tagawa et al. |
| 2009/0156186 A1 | 6/2009 | Lyle |
| 2009/0158423 A1 | 6/2009 | Orlassino |
| 2009/0184884 A1 | 7/2009 | Kyou et al. |
| 2009/0185699 A1 | 7/2009 | Kim |
| 2009/0226011 A1 | 9/2009 | Abolfathi et al. |
| 2009/0226017 A1 | 9/2009 | Abolfathi et al. |
| 2009/0226020 A1 | 9/2009 | Abolfathi et al. |
| 2009/0245556 A1 | 10/2009 | Parker et al. |
| 2009/0245557 A1 | 10/2009 | Parker |
| 2009/0288489 A1 | 11/2009 | Lee et al. |
| 2009/0290730 A1 | 11/2009 | Fukuda et al. |
| 2009/0304210 A1 | 12/2009 | Weisman |
| 2009/0323976 A1 | 12/2009 | Asada et al. |
| 2010/0056227 A1 | 3/2010 | Hayakawa et al. |
| 2010/0061582 A1 | 3/2010 | Takigawa et al. |
| 2010/0061584 A1 | 3/2010 | Lin et al. |
| 2010/0098269 A1 | 4/2010 | Abolfathi et al. |
| 2010/0150368 A1 | 6/2010 | Chang et al. |
| 2010/0172519 A1 | 7/2010 | Kimura et al. |
| 2010/0178597 A1 | 7/2010 | Ishida et al. |
| 2010/0178957 A1 | 7/2010 | Chen |
| 2010/0184487 A1 | 7/2010 | Takada |
| 2010/0216526 A1 | 8/2010 | Chen et al. |
| 2010/0222639 A1 | 9/2010 | Purcell et al. |
| 2010/0238108 A1 | 9/2010 | Rekimoto |
| 2010/0245585 A1 | 9/2010 | Fisher |
| 2010/0246878 A1 | 9/2010 | Sim et al. |
| 2010/0254562 A1 | 10/2010 | Koo |
| 2010/0310086 A1 | 12/2010 | Magrath et al. |
| 2010/0311462 A1 | 12/2010 | Endo et al. |
| 2010/0320961 A1 | 12/2010 | Castillo |
| 2010/0322127 A1 | 12/2010 | Nakajima |
| 2010/0328033 A1 | 12/2010 | Kamei |
| 2010/0329485 A1 | 12/2010 | Fukuda et al. |
| 2011/0028190 A1 | 2/2011 | Mizuta et al. |
| 2011/0028777 A1 | 2/2011 | Rastatter et al. |
| 2011/0034219 A1 | 2/2011 | Filson |
| 2011/0059769 A1 | 3/2011 | Brunolli |
| 2011/0143769 A1 | 6/2011 | Jones et al. |
| 2011/0143819 A1 | 6/2011 | Sugiyama et al. |
| 2011/0158425 A1 | 6/2011 | Hayakawa |
| 2011/0159855 A1 | 6/2011 | Cheng |
| 2011/0169622 A1 | 7/2011 | Billmaier |
| 2011/0170718 A1 | 7/2011 | Fukuda et al. |
| 2011/0180542 A1 | 7/2011 | Drollinger et al. |
| 2011/0201301 A1 | 8/2011 | Okada et al. |
| 2011/0224481 A1 | 9/2011 | Lee et al. |
| 2011/0237306 A1 | 9/2011 | Kamii |
| 2011/0254616 A1 | 10/2011 | Kawano |
| 2011/0263200 A1 | 10/2011 | Thornton et al. |
| 2011/0267551 A1 | 11/2011 | Yokote et al. |
| 2011/0280416 A1 | 11/2011 | Abolfathi et al. |
| 2011/0281617 A1 | 11/2011 | Kim et al. |
| 2011/0293105 A1 | 12/2011 | Arie et al. |
| 2011/0293133 A1 | 12/2011 | Yan |
| 2011/0299695 A1 | 12/2011 | Nicholson |
| 2011/0301729 A1 | 12/2011 | Heiman et al. |
| 2012/0008793 A1 | 1/2012 | Knox et al. |
| 2012/0008807 A1 | 1/2012 | Gran |
| 2012/0010735 A1 | 1/2012 | Gilboa |
| 2012/0020503 A1 | 1/2012 | Endo et al. |
| 2012/0028679 A1 | 2/2012 | Ozasa |
| 2012/0082329 A1 | 4/2012 | Neumeyer |
| 2012/0082335 A1 | 4/2012 | Duisters et al. |
| 2012/0105192 A1 | 5/2012 | Norieda |
| 2012/0130660 A1 | 5/2012 | Neumeyer |
| 2012/0133213 A1 | 5/2012 | Borke et al. |
| 2012/0139750 A1 | 6/2012 | Hayakawa et al. |
| 2012/0140917 A1 | 6/2012 | Nicholson et al. |
| 2012/0162143 A1 | 6/2012 | Kai et al. |
| 2012/0182429 A1 | 7/2012 | Forutanpour et al. |
| 2012/0183163 A1 | 7/2012 | Apfel |
| 2012/0219161 A1 | 8/2012 | Amada |
| 2012/0221329 A1 | 8/2012 | Harsch |
| 2012/0237075 A1 | 9/2012 | East et al. |
| 2012/0238908 A1 | 9/2012 | Osako et al. |
| 2012/0244917 A1 | 9/2012 | Hosoi et al. |
| 2012/0249223 A1 | 10/2012 | Neugebauer |
| 2012/0253236 A1 | 10/2012 | Snow |
| 2012/0283746 A1 | 11/2012 | Hu et al. |
| 2012/0289162 A1 | 11/2012 | Hosoi et al. |
| 2012/0298441 A1 | 11/2012 | Lin et al. |
| 2012/0300956 A1 | 11/2012 | Horii |
| 2012/0301859 A1 | 11/2012 | Rastatter et al. |
| 2012/0330654 A1 | 12/2012 | Angell |
| 2013/0039508 A1 | 2/2013 | Chen et al. |
| 2013/0051585 A1 | 2/2013 | Karkkainen |
| 2013/0100596 A1 | 4/2013 | Yokote et al. |
| 2013/0111346 A1 | 5/2013 | Little |
| 2013/0120311 A1 | 5/2013 | Ichikawa |
| 2013/0129121 A1 | 5/2013 | Yamashita |
| 2013/0136279 A1 | 5/2013 | Brown |
| 2013/0142348 A1 | 6/2013 | Weisman |
| 2013/0169352 A1 | 7/2013 | Kawano |
| 2013/0169829 A1 | 7/2013 | Homma et al. |
| 2013/0177188 A1 | 7/2013 | Apfel |
| 2013/0180033 A1 | 7/2013 | Uemoto et al. |
| 2013/0191114 A1 | 7/2013 | Gim |
| 2013/0236043 A1 | 9/2013 | Abolfathi et al. |
| 2013/0242262 A1 | 9/2013 | Lewis |
| 2013/0242809 A1 | 9/2013 | Tone et al. |
| 2013/0252675 A1 | 9/2013 | Nicholson |
| 2013/0259221 A1 | 10/2013 | Shusaku et al. |
| 2013/0281152 A1 | 10/2013 | Nishimura |
| 2013/0293373 A1 | 11/2013 | Gegner et al. |
| 2013/0301860 A1 | 11/2013 | Neumeyer et al. |
| 2013/0308799 A1 | 11/2013 | Lin et al. |
| 2013/0316691 A1 | 11/2013 | Forutanpour et al. |
| 2013/0322670 A1 | 12/2013 | Hosoi et al. |
| 2013/0324193 A1 | 12/2013 | Hosoi et al. |
| 2013/0335210 A1 | 12/2013 | Arai et al. |
| 2013/0336507 A1 | 12/2013 | Gran |
| 2014/0003641 A1 | 1/2014 | Neumeyer et al. |
| 2014/0086417 A1 | 3/2014 | Hansen et al. |
| 2014/0205124 A1 | 6/2014 | Azmi et al. |
| 2014/0201889 A1 | 7/2014 | Pietrzak |
| 2014/0233356 A1* | 8/2014 | Pattikonda ............ G04G 9/0064 368/13 |
| 2014/0313280 A1 | 10/2014 | Takuno et al. |
| 2014/0342783 A1 | 11/2014 | Suzuki et al. |
| 2014/0355792 A1 | 12/2014 | Nabata |
| 2014/0378191 A1 | 12/2014 | Hosoi et al. |
| 2015/0022438 A1 | 1/2015 | Hong |
| 2015/0023527 A1 | 1/2015 | Sato |
| 2015/0043748 A1 | 2/2015 | Sudo |
| 2015/0043758 A1 | 2/2015 | Yamada |
| 2015/0054779 A1 | 2/2015 | Horii et al. |
| 2015/0065057 A1 | 3/2015 | Hosoi et al. |
| 2015/0070083 A1 | 3/2015 | Kawano |
| 2015/0078569 A1 | 3/2015 | Magrath et al. |
| 2015/0086047 A1 | 3/2015 | Horii et al. |
| 2015/0110318 A1 | 4/2015 | Miyano |
| 2015/0110322 A1 | 4/2015 | Andersson |
| 2015/0131816 A1 | 5/2015 | Inagaki |
| 2015/0131838 A1 | 5/2015 | Horii |
| 2015/0141088 A1 | 5/2015 | Hosoi et al. |
| 2015/0156295 A1 | 6/2015 | Kazama |
| 2015/0172588 A1 | 6/2015 | Homma et al. |
| 2015/0181338 A1 | 6/2015 | Hosoi et al. |
| 2015/0208153 A1 | 7/2015 | Hosoi et al. |
| 2015/0256656 A1 | 9/2015 | Horii |

(56) References Cited

U.S. PATENT DOCUMENTS

| | | | |
|---|---|---|---|
| 2015/0256946 A1 | 9/2015 | Neumeyer et al. | |
| 2015/0289052 A1 | 10/2015 | Takeda et al. | |
| 2015/0320135 A1 | 11/2015 | Lowe | |
| 2016/0007109 A1 | 1/2016 | Neumeyer et al. | |
| 2016/0058091 A1 | 3/2016 | Sasaki | |
| 2016/0062392 A1* | 3/2016 | Townsend | A44C 5/00 361/679.03 |
| 2016/0073202 A1 | 3/2016 | Nabata et al. | |
| 2016/0086594 A1 | 3/2016 | Asada et al. | |
| 2016/0100262 A1 | 4/2016 | Inagaki | |
| 2016/0150328 A1 | 5/2016 | Inagaki | |
| 2016/0205233 A1 | 7/2016 | Hosoi et al. | |
| 2016/0248894 A1 | 8/2016 | Hosoi et al. | |
| 2016/0261299 A1 | 9/2016 | Hosoi et al. | |
| 2016/0286296 A1 | 9/2016 | Hosoi et al. | |
| 2016/0337760 A1 | 11/2016 | Suenaga | |
| 2016/0349803 A1 | 12/2016 | Dusan | |
| 2017/0006144 A1 | 1/2017 | Hosoi et al. | |
| 2017/0013338 A1* | 1/2017 | Wong | H04R 1/028 |
| 2017/0026727 A1 | 1/2017 | Hosoi et al. | |
| 2017/0213452 A1 | 7/2017 | Brunolli | |
| 2017/0230754 A1 | 8/2017 | Dusan | |
| 2017/0295269 A1 | 10/2017 | Hosoi | |
| 2017/0302320 A1 | 10/2017 | Hosoi et al. | |
| 2017/0353797 A1 | 12/2017 | Hosoi et al. | |
| 2018/0124222 A1 | 5/2018 | Hosoi et al. | |
| 2018/0199127 A1 | 7/2018 | Hosoi et al. | |
| 2018/0259915 A1 | 9/2018 | Hosoi | |
| 2018/0262839 A1 | 9/2018 | Hosoi et al. | |
| 2018/0332152 A1 | 11/2018 | Hosoi et al. | |
| 2018/0352061 A1 | 12/2018 | Hosoi et al. | |
| 2019/0028580 A1 | 1/2019 | Hosoi | |

FOREIGN PATENT DOCUMENTS

| | | |
|---|---|---|
| CN | 1276142 | 12/2000 |
| CN | 1311942 | 9/2001 |
| CN | 1411253 | 4/2003 |
| CN | 2575916 Y | 9/2003 |
| CN | 1141856 | 3/2004 |
| CN | 1627864 A | 6/2005 |
| CN | 1672114 | 9/2005 |
| CN | 1679371 | 10/2005 |
| CN | 1723733 A | 1/2006 |
| CN | 1791283 | 6/2006 |
| CN | 2800681 Y | 7/2006 |
| CN | 1843019 | 10/2006 |
| CN | 1984505 A | 6/2007 |
| CN | 101022678 A | 8/2007 |
| CN | 201035260 Y | 3/2008 |
| CN | 101267463 | 9/2008 |
| CN | 101277331 | 10/2008 |
| CN | 101321196 | 12/2008 |
| CN | 101355823 | 1/2009 |
| CN | 101360140 | 2/2009 |
| CN | 101390438 | 3/2009 |
| CN | 101390440 | 3/2009 |
| CN | 201216023 | 4/2009 |
| CN | 101513081 | 8/2009 |
| CN | 101594161 | 12/2009 |
| CN | 101795143 | 8/2010 |
| CN | 101874410 | 10/2010 |
| CN | 101897198 | 11/2010 |
| CN | 102075633 | 5/2011 |
| CN | 201845183 U | 5/2011 |
| CN | 102670206 | 9/2012 |
| CN | 102959930 | 3/2013 |
| CN | 203039851 | 7/2013 |
| CN | 103281953 | 9/2013 |
| CN | 203181220 | 9/2013 |
| CN | 103999480 | 8/2014 |
| EP | 1705875 | 3/2005 |
| EP | 1705075 | 9/2006 |
| EP | 1705874 | 9/2006 |
| EP | 1783919 | 5/2007 |
| EP | 1970792 | 9/2008 |
| EP | 2388981 | 11/2011 |
| JP | S51-94220 | 8/1976 |
| JP | S5236894 A | 3/1977 |
| JP | S55-088497 | 7/1980 |
| JP | S56-17780 | 2/1981 |
| JP | S6-089086 | 7/1981 |
| JP | S5690018 | 7/1981 |
| JP | S7169312 U | 10/1982 |
| JP | S57162611 | 10/1982 |
| JP | S58-182398 | 10/1983 |
| JP | S60116800 | 8/1985 |
| JP | S62-208680 | 9/1987 |
| JP | S63-115728 | 7/1988 |
| JP | 63-142981 | 9/1988 |
| JP | S63140753 | 9/1988 |
| JP | H0212099 | 1/1990 |
| JP | H02-62199 | 3/1990 |
| JP | 2-182098 | 7/1990 |
| JP | H02-248121 | 10/1990 |
| JP | 3-29424 | 2/1991 |
| JP | H03117995 | 12/1991 |
| JP | 4-90298 | 3/1992 |
| JP | H04-303815 | 10/1992 |
| JP | H0573073 | 3/1993 |
| JP | H05-41297 | 6/1993 |
| JP | H05-183618 | 7/1993 |
| JP | H05-207579 | 8/1993 |
| JP | H05-292167 | 11/1993 |
| JP | 06-030494 | 2/1994 |
| JP | 3003950 | 8/1994 |
| JP | 3009206 | 1/1995 |
| JP | 07-107146 | 4/1995 |
| JP | 07-131268 | 5/1995 |
| JP | H7-039150 | 7/1995 |
| JP | H07210176 | 8/1995 |
| JP | 08-033026 | 2/1996 |
| JP | H879338 | 3/1996 |
| JP | 8-102780 | 4/1996 |
| JP | H08-090986 | 4/1996 |
| JP | H08111703 | 4/1996 |
| JP | 08-237185 | 9/1996 |
| JP | H08-256080 | 10/1996 |
| JP | H09-023256 | 1/1997 |
| JP | H10-042021 | 2/1998 |
| JP | 3050147 | 4/1998 |
| JP | 10-136480 | 5/1998 |
| JP | H10-200608 | 7/1998 |
| JP | 10-227 U | 9/1998 |
| JP | H11112672 | 4/1999 |
| JP | H11-163980 | 6/1999 |
| JP | 3064055 | 9/1999 |
| JP | 11-298595 | 10/1999 |
| JP | H11-352138 | 12/1999 |
| JP | 2000-013294 | 1/2000 |
| JP | 2000-031858 | 1/2000 |
| JP | 2000-49935 | 2/2000 |
| JP | 3066305 U | 2/2000 |
| JP | 3070222 | 4/2000 |
| JP | 2000-217015 | 8/2000 |
| JP | 2000-295696 | 10/2000 |
| JP | 2002-295696 | 10/2000 |
| JP | 2000-322186 | 11/2000 |
| JP | 2000-324217 | 11/2000 |
| JP | 2000-339793 | 12/2000 |
| JP | 2001-125742 | 5/2001 |
| JP | 2001-169016 | 6/2001 |
| JP | 2001-177809 | 6/2001 |
| JP | 2001-268211 | 9/2001 |
| JP | 2001-287183 | 10/2001 |
| JP | 2001-320790 | 11/2001 |
| JP | 2001-333161 | 11/2001 |
| JP | 2001-339504 | 12/2001 |
| JP | 2001-352395 | 12/2001 |
| JP | 2002-016720 | 1/2002 |
| JP | 2002023115 | 1/2002 |
| JP | 2002-036158 | 2/2002 |
| JP | 2002-041411 | 2/2002 |

(56) References Cited

FOREIGN PATENT DOCUMENTS

| | | |
|---|---|---|
| JP | 2002-051111 | 2/2002 |
| JP | 2002-84575 | 3/2002 |
| JP | 2002-111822 | 4/2002 |
| JP | 2002-149312 | 5/2002 |
| JP | 2002-164986 | 6/2002 |
| JP | 2002-171321 | 6/2002 |
| JP | 2002-223475 | 8/2002 |
| JP | 2002-238262 | 8/2002 |
| JP | 2002-262377 | 9/2002 |
| JP | 3090729 | 10/2002 |
| JP | 2002-359889 | 12/2002 |
| JP | 2002-368839 | 12/2002 |
| JP | 2003-032343 | 1/2003 |
| JP | 2003-032768 | 1/2003 |
| JP | 2003-037651 | 2/2003 |
| JP | 2003-037885 | 2/2003 |
| JP | 2003-101625 | 4/2003 |
| JP | 2003-102094 | 4/2003 |
| JP | 2003-103220 | 4/2003 |
| JP | 2003-111175 | 4/2003 |
| JP | 2003-125473 | 4/2003 |
| JP | 2003-143253 | 5/2003 |
| JP | 2003-145048 | 5/2003 |
| JP | 2003-169115 | 6/2003 |
| JP | 2003-173375 | 6/2003 |
| JP | 2003-179988 | 6/2003 |
| JP | 2003-188985 | 7/2003 |
| JP | 2003-198719 | 7/2003 |
| JP | 2003-211087 | 7/2003 |
| JP | 2003-218989 | 7/2003 |
| JP | 2003-274376 | 9/2003 |
| JP | 2003-274470 | 9/2003 |
| JP | 2003-300015 | 10/2003 |
| JP | 2003-304308 | 10/2003 |
| JP | 2003-319022 | 11/2003 |
| JP | 2003-348208 | 12/2003 |
| JP | 2004-064457 | 2/2004 |
| JP | 2004-094389 | 3/2004 |
| JP | 2004-128915 | 4/2004 |
| JP | 2004-157873 | 6/2004 |
| JP | 2004-158961 | 6/2004 |
| JP | 2004-166174 | 6/2004 |
| JP | 2004-173018 | 6/2004 |
| JP | 2004-173264 | 6/2004 |
| JP | 2004-187031 | 7/2004 |
| JP | 2004-190699 | 7/2004 |
| JP | 2004-205839 | 7/2004 |
| JP | 2004-208220 | 7/2004 |
| JP | 2004-233316 | 8/2004 |
| JP | 2004-252626 | 9/2004 |
| JP | 2004-266321 | 9/2004 |
| JP | 2004-274438 | 9/2004 |
| JP | 2004-357198 | 12/2004 |
| JP | 2005-020234 | 1/2005 |
| JP | 2005-020730 | 1/2005 |
| JP | 2005-074257 | 3/2005 |
| JP | 2005072643 | 3/2005 |
| JP | 2005-311125 | 4/2005 |
| JP | 2005-512440 | 4/2005 |
| JP | 2005-142729 | 6/2005 |
| JP | 2005-142835 | 6/2005 |
| JP | 2005-159969 | 6/2005 |
| JP | 2005151292 A | 6/2005 |
| JP | 2005-184267 | 7/2005 |
| JP | 2005-223717 | 8/2005 |
| JP | 2005/229324 | 8/2005 |
| JP | 2005-229324 | 8/2005 |
| JP | 2005-237026 | 9/2005 |
| JP | 2005-244968 | 9/2005 |
| JP | 2005-328125 | 11/2005 |
| JP | 2005-534269 | 11/2005 |
| JP | 2005-340927 | 12/2005 |
| JP | 2005-341543 | 12/2005 |
| JP | 2005-348193 | 12/2005 |
| JP | 2005-352024 | 12/2005 |
| JP | 2006-005625 | 1/2006 |
| JP | 2006-007342 | 1/2006 |
| JP | 2006-007919 | 1/2006 |
| JP | 2006-011591 | 1/2006 |
| JP | 2006-019812 | 1/2006 |
| JP | 2006-050056 | 2/2006 |
| JP | 2006-051300 | 2/2006 |
| JP | 2006-066972 | 3/2006 |
| JP | 2006-067049 | 3/2006 |
| JP | 2006-074671 | 3/2006 |
| JP | 2006-086581 | 3/2006 |
| JP | 2006-094158 | 4/2006 |
| JP | 2006-109326 | 4/2006 |
| JP | 2006-115060 | 4/2006 |
| JP | 2006-115476 | 4/2006 |
| JP | 2006-129117 | 5/2006 |
| JP | 2006-129404 | 5/2006 |
| JP | 2006-148295 | 6/2006 |
| JP | 2006-155734 | 6/2006 |
| JP | 2006-157226 | 6/2006 |
| JP | 2006-157318 | 6/2006 |
| JP | 2006-165702 | 6/2006 |
| JP | 2006-166128 | 6/2006 |
| JP | 2006-166300 | 6/2006 |
| JP | 2006/186691 | 7/2006 |
| JP | 2006-197267 | 7/2006 |
| JP | 2006-197404 | 7/2006 |
| JP | 2006-211317 | 8/2006 |
| JP | 2006-217088 | 8/2006 |
| JP | 2006-217321 | 8/2006 |
| JP | 2006-226506 | 8/2006 |
| JP | 2006-229647 | 8/2006 |
| JP | 2006-238072 | 9/2006 |
| JP | 2006-283541 | 10/2006 |
| JP | 2006-295786 | 10/2006 |
| JP | 2006-303618 | 11/2006 |
| JP | 2006-333058 | 12/2006 |
| JP | 2006-339914 | 12/2006 |
| JP | 2006-345025 | 12/2006 |
| JP | 2006-345471 | 12/2006 |
| JP | 2007-003702 | 1/2007 |
| JP | 2007-006369 | 1/2007 |
| JP | 2007-010518 | 1/2007 |
| JP | 2007-019898 | 1/2007 |
| JP | 2007-019957 | 1/2007 |
| JP | 2007-020051 | 1/2007 |
| JP | 2007-028469 | 2/2007 |
| JP | 2007-051007 | 3/2007 |
| JP | 2007-051395 | 3/2007 |
| JP | 2007-072015 | 3/2007 |
| JP | 2007-074663 | 3/2007 |
| JP | 2007-081276 | 3/2007 |
| JP | 2007505540 A | 3/2007 |
| JP | 2007-096386 | 4/2007 |
| JP | 2007-103989 | 4/2007 |
| JP | 2007-104548 | 4/2007 |
| JP | 2007-104603 | 4/2007 |
| JP | 2007-129740 | 5/2007 |
| JP | 2007-133698 | 5/2007 |
| JP | 2007-142920 | 6/2007 |
| JP | 2007-165938 | 6/2007 |
| JP | 2007-180827 | 7/2007 |
| JP | 2007-189578 | 7/2007 |
| JP | 2007-195239 | 8/2007 |
| JP | 2007-214883 | 8/2007 |
| JP | 2007-228508 | 9/2007 |
| JP | 2007-268028 | 10/2007 |
| JP | 2007-275819 | 10/2007 |
| JP | 2007-281916 | 10/2007 |
| JP | 2007-306465 | 11/2007 |
| JP | 2007-307124 | 11/2007 |
| JP | 2007-330560 | 12/2007 |
| JP | 2007-336418 | 12/2007 |
| JP | 2008-000709 | 1/2008 |
| JP | 2008-006558 | 1/2008 |
| JP | 2008-017327 | 1/2008 |
| JP | 2008-017398 | 1/2008 |
| JP | 2008006558 | 1/2008 |
| JP | 2008-042324 | 2/2008 |

(56) References Cited

FOREIGN PATENT DOCUMENTS

| | | |
|---|---|---|
| JP | 2008-046844 | 2/2008 |
| JP | 2008-085417 | 4/2008 |
| JP | 2008-092164 | 4/2008 |
| JP | 2008-092313 | 4/2008 |
| JP | 2008-511217 | 4/2008 |
| JP | 2008-121796 | 5/2008 |
| JP | 2008-135991 | 6/2008 |
| JP | 2008-141589 | 6/2008 |
| JP | 2008-141687 | 6/2008 |
| JP | 2008-148086 | 6/2008 |
| JP | 2008-149427 | 7/2008 |
| JP | 2008-153783 | 7/2008 |
| JP | 2008-177705 | 7/2008 |
| JP | 2008177629 | 7/2008 |
| JP | 3144392 | 8/2008 |
| JP | 2008-227123 | 9/2008 |
| JP | 2008-227806 | 9/2008 |
| JP | 2008-229531 | 10/2008 |
| JP | 2008-263383 | 10/2008 |
| JP | 2008-301071 | 12/2008 |
| JP | 2009-010593 | 1/2009 |
| JP | 2009-044510 | 2/2009 |
| JP | 2009-077260 | 4/2009 |
| JP | 2009-088942 | 4/2009 |
| JP | 2009-094986 | 4/2009 |
| JP | 2009-22261 | 5/2009 |
| JP | 2009-111820 | 5/2009 |
| JP | 2009-117953 | 5/2009 |
| JP | 2009-118396 | 5/2009 |
| JP | 2009-147680 | 7/2009 |
| JP | 2009-159402 | 7/2009 |
| JP | 2009-159577 | 7/2009 |
| JP | 2009-166213 | 7/2009 |
| JP | 2009-171249 | 7/2009 |
| JP | 2009166213 | 7/2009 |
| JP | 4307488 | 8/2009 |
| JP | 2009-207056 | 10/2009 |
| JP | 2009-232443 | 10/2009 |
| JP | 2009-246954 | 10/2009 |
| JP | 2009-260883 | 11/2009 |
| JP | 2009-267616 | 11/2009 |
| JP | 2009-542038 | 11/2009 |
| JP | 2010-010945 | 1/2010 |
| JP | 2010-011117 | 1/2010 |
| JP | 2010-054731 | 3/2010 |
| JP | 2010-068299 | 3/2010 |
| JP | 2010-087810 | 4/2010 |
| JP | 2010-094799 | 4/2010 |
| JP | 2010-109795 | 5/2010 |
| JP | 2010-124287 | 6/2010 |
| JP | 2010-147727 | 7/2010 |
| JP | 2010-166406 | 7/2010 |
| JP | 2010-524295 | 7/2010 |
| JP | 4541111 | 7/2010 |
| JP | 2010-528547 | 8/2010 |
| JP | 2010-207963 | 9/2010 |
| JP | 2010-245854 | 10/2010 |
| JP | 2010232755 | 10/2010 |
| JP | 2010-258701 | 11/2010 |
| JP | 2010-268336 | 11/2010 |
| JP | 2010-283541 | 12/2010 |
| JP | 2011-004195 | 1/2011 |
| JP | 2011-008503 | 1/2011 |
| JP | 2011-010791 | 1/2011 |
| JP | 2011-015193 | 1/2011 |
| JP | 2011-017969 | 1/2011 |
| JP | 2011-035560 | 2/2011 |
| JP | 2011-048697 | 3/2011 |
| JP | 2011-053744 | 3/2011 |
| JP | 2011-059376 | 3/2011 |
| JP | 2011-087142 | 4/2011 |
| JP | 2011-512745 | 4/2011 |
| JP | 2011-130334 | 6/2011 |
| JP | 2011114454 | 6/2011 |
| JP | 2011-135489 | 7/2011 |
| JP | 2011-139439 | 7/2011 |
| JP | 2011-139462 | 7/2011 |
| JP | 2011-212167 | 10/2011 |
| JP | 2011-223556 | 11/2011 |
| JP | 2011-223824 | 11/2011 |
| JP | 2011-233971 | 11/2011 |
| JP | 2011-234323 | 11/2011 |
| JP | 2012-028852 | 2/2012 |
| JP | 2012-034064 | 2/2012 |
| JP | 2012-508499 | 4/2012 |
| JP | 2012070245 | 4/2012 |
| JP | 2012-109663 | 6/2012 |
| JP | 2012-138770 | 7/2012 |
| JP | 2012-142679 | 7/2012 |
| JP | 2012-515574 | 7/2012 |
| JP | 2012-150266 | 8/2012 |
| JP | 2012-156781 | 8/2012 |
| JP | 2012-169817 | 9/2012 |
| JP | 2012-178695 | 9/2012 |
| JP | 2012-196455 | 10/2012 |
| JP | 5108161 | 10/2012 |
| JP | 2012-249097 | 12/2012 |
| JP | 2012-257072 | 12/2012 |
| JP | 2012244515 | 12/2012 |
| JP | 2013-005212 | 1/2013 |
| JP | 2013-055492 | 3/2013 |
| JP | 2013-061176 | 4/2013 |
| JP | 2013-078116 | 4/2013 |
| JP | 2013-514737 | 4/2013 |
| JP | 5246695 | 4/2013 |
| JP | 2013078116 | 4/2013 |
| JP | 2013-081047 | 5/2013 |
| JP | 2013-105272 | 5/2013 |
| JP | 2013-115638 | 6/2013 |
| JP | 2013-115800 | 6/2013 |
| JP | 2013-128896 | 7/2013 |
| JP | 2013-130402 | 7/2013 |
| JP | 2013-162167 | 8/2013 |
| JP | 2013-198072 | 9/2013 |
| JP | 2013-201560 | 10/2013 |
| JP | 2013-232860 | 11/2013 |
| JP | 2013-235316 | 11/2013 |
| JP | 2013-236396 | 11/2013 |
| JP | 2013-255091 | 12/2013 |
| JP | 2013-255212 | 12/2013 |
| JP | 2014-003488 | 1/2014 |
| JP | 2014-068346 | 4/2014 |
| JP | 2014-089494 | 5/2014 |
| JP | 2014-116972 | 6/2014 |
| JP | 2014116755 | 6/2014 |
| JP | 3193583 U | 9/2014 |
| JP | 2014165692 | 9/2014 |
| JP | 2014-190965 | 10/2014 |
| JP | 2014-216861 | 11/2014 |
| JP | 2014-229991 | 12/2014 |
| JP | 2014-232905 | 12/2014 |
| JP | 5676003 | 2/2015 |
| JP | 2015-053640 | 3/2015 |
| JP | 2015-061285 | 3/2015 |
| JP | 2015-082818 | 4/2015 |
| JP | 2015-084801 | 5/2015 |
| JP | 2015089016 | 5/2015 |
| JP | 2015-139132 | 7/2015 |
| JP | 3200747 U | 10/2015 |
| JP | 2015222908 | 12/2015 |
| KR | 970008927 | 5/1997 |
| KR | 10-1998-0022845 | 6/1998 |
| KR | 20-0389666 | 7/2005 |
| KR | 10-2005-0086378 | 8/2005 |
| KR | 20060121606 | 11/2006 |
| KR | 10-2007-0109323 | 11/2007 |
| KR | 10-2008-0009602 | 1/2008 |
| KR | 10-2008-0040962 | 5/2008 |
| KR | 10-2008-0006514 | 11/2008 |
| KR | 10-2009-0033564 | 4/2009 |
| KR | 1020090082879 | 7/2009 |
| KR | 10-2009-0120951 | 11/2009 |
| KR | 10-2010-0034906 | 4/2010 |
| KR | 10-2010-0041386 | 4/2010 |

(56) References Cited

FOREIGN PATENT DOCUMENTS

| | | |
|---|---|---|
| KR | 20110006838 | 1/2011 |
| KR | 20110121012 | 11/2011 |
| KR | 20120015209 | 2/2012 |
| KR | 101358881 | 2/2014 |
| KR | 20150010087 | 1/2015 |
| KR | 20160003340 | 1/2016 |
| KR | 10-2017755 | 9/2019 |
| TW | 200423682 | 11/2004 |
| TW | 200536415 | 11/2005 |
| TW | 200539664 | 12/2005 |
| TW | 200605621 | 2/2006 |
| TW | 1353164 B | 3/2009 |
| TW | I391880/200912814 | 3/2009 |
| TW | 201018982 | 5/2010 |
| TW | 201119339 | 6/2011 |
| TW | M452360 U | 5/2013 |
| TW | 201342313 | 10/2013 |
| TW | 201513629 | 4/2015 |
| WO | 1996/27253 | 9/1996 |
| WO | WO 1998/05148 | 2/1998 |
| WO | WO 2001087007 | 11/2001 |
| WO | WO 2003/055183 | 7/2003 |
| WO | WO 2004/034734 | 4/2004 |
| WO | WO 2005/067339 | 7/2005 |
| WO | WO 2005/069586 | 7/2005 |
| WO | 2005/086522 | 9/2005 |
| WO | WO 2005/091670 | 9/2005 |
| WO | WO 2005/096599 | 10/2005 |
| WO | WO 2005/096664 | 10/2005 |
| WO | WO 2006/006313 | 1/2006 |
| WO | WO 2006/021133 | 3/2006 |
| WO | WO 2006/028045 | 3/2006 |
| WO | WO 2006/075440 | 7/2006 |
| WO | WO 2007/034739 | 3/2007 |
| WO | 2007/046269 | 4/2007 |
| WO | WO 2007046269 | 4/2007 |
| WO | WO 2007/099707 | 9/2007 |
| WO | WO 2008/007666 | 1/2008 |
| WO | WO 2008/029515 | 3/2008 |
| WO | WO 2009/104437 | 8/2009 |
| WO | WO 2009/133873 | 11/2009 |
| WO | WO 2009/136498 | 11/2009 |
| WO | WO 2009/141912 | 11/2009 |
| WO | WO 2010/005045 | 1/2010 |
| WO | WO 2010/050154 | 5/2010 |
| WO | WO 2010/060323 | 6/2010 |
| WO | WO 2010/116510 | 10/2010 |
| WO | WO 2010/140087 | 12/2010 |
| WO | WO 2011/007679 | 1/2011 |
| WO | WO 2011/023672 | 3/2011 |
| WO | WO 2011/090944 | 7/2011 |
| WO | WO 2011/121740 | 10/2011 |
| WO | WO 2011/153165 | 12/2011 |
| WO | WO 2011/159349 | 12/2011 |
| WO | WO 2002/021881 | 3/2012 |
| WO | WO 2012/090947 | 7/2012 |
| WO | WO 2012097314 | 7/2012 |
| WO | WO 2012/114772 | 8/2012 |
| WO | WO 2012/114917 | 8/2012 |
| WO | WO 2013/047609 | 4/2013 |
| WO | WO 2013/121631 | 8/2013 |
| WO | WO 2013/168628 | 11/2013 |
| WO | 2014/156534 | 10/2014 |
| WO | WO 2014/156534 | 10/2014 |
| WO | 2015/064340 | 5/2015 |
| WO | 2015-122879 | 8/2015 |
| WO | WO 2015/122879 | 8/2015 |
| WO | WO 2015033677 | 3/2017 |
| WO | WO 2017099938 | 6/2017 |

OTHER PUBLICATIONS

Japan Patent Office, JP Application No. 2015-082557 dated Mar. 19, 2019 (with English translation).
Japanese Patent Office, International Search Report for PCT/JP2013/067781 dated Oct. 1, 2013 (with English translation).
Japanese Patent Office, International Search Report for International Patent Application PCT/JP2012/066376 (dated Oct. 30, 2012).
International Search Report for International Patent Application PCT/JP2011/080099 (dated Apr. 3, 2012).
Taiwanese Patent Office, search report in application 100148983 (2 pages) (dated Jan. 17, 2013).
U.S. Patent and Trademark Office, Office Action in U.S. Appl. No. 13/556,367 (dated Oct. 19, 2012).
European Patent Office, official communication in Application No. EP 11 85 3718 (dated May 14, 2014).
U.S. Patent and Trademark Office, Office Action in U.S. Appl. No. 13/489,971 (dated Oct. 24, 2012).
Isaka et al., "Development of Bone Conduction Speaker by Using Piezoelectric Vibration," The Japan Society of Mechanical Engineers (No. 04-5) Dynamics and Design Conference 2004 CD-ROM Compilation (Sep. 27-30, 2004; Tokyo) (and English translation).
Japanese Patent Office, International Search Report for International Patent Application PCT/JP2012/053231 (dated Mar. 13, 2012).
Extended European Search Report in European patent application No. 12866397.8 dated Jul. 20, 2015.
Japanese Patent Office, International Search Report for PCT/JP2014/071607 dated Nov. 11, 2014 (with English translation).
Japan Patent Office, International Search Report for PCT/JP2014/077792 dated Dec. 16, 2014 (with English translation).
Extended European Search Report for PCTJP2013067781 dated Feb. 19, 2016.
Japanese Patent Office, official communication in Japanese Patent Application No. 2012-054308 dated Jun. 7, 2016 (and machine translation).
Japanese Patent Office, official communication in Japanese Patent Application No. 2015-056466 dated Jul. 12, 2016 (and machine translation).
Japanese Patent Office, official communication in Japanese Patent Application No. 2015-217427 dated Jul. 19, 2016 (and machine translation).
Japanese Patent Office, official communication in Japanese Patent Application No. 2015-217421 dated Jul. 19, 2016 (and machine translation).
SIPO of People's Republic of China, official communication for Chinese Patent Application No. 201180031904.5 dated Jul. 20, 2016 (and machine translation).
Japanese Patent Office, official communication in Japanese Patent Application No. 2012-120173 dated Jul. 26, 2016 (and machine translation).
Japanese Patent Office, official communication in Japanese Patent Application No. 2015-048052 dated Aug. 2, 2016 (and machine translation).
Japanese Patent Office, official communication in Japanese Patent Application No. 2012-147753 dated Aug. 23, 2016 (and machine translation).
Japanese Patent Office, official communication in Japanese Patent Application No. 2015-231478 dated Aug. 30, 2016 (and machine translation).
News Release, "New Offer of Smartphone Using Cartilage Conduction", Rohm Semiconductor, Kyoto, Japan, Apr. 23, 2012 (with English translation).
European Patent Office, Partial Search Report for EP 11 85 3443 dated Oct. 27, 2016.
Japan Patent Office, International Search Report for PCT/JP2015/071490 dated Nov. 2, 2015 with English translation.
U.S. Patent and Trademark Office, Office Action in U.S. Appl. No. 15/049,403 dated Nov. 23, 2016.
U.S. Patent and Trademark Office, Office Action in U.S. Appl. No. 15/174,746 dated Nov. 25, 2016.
Smartphone Black Berry Bold 9700, Operation guide (2010).
Office Action for JP Patent Application No. 2016-013411 dated Nov. 22, 2016 with English Translation.
Office Action for KR Patent Application No. 10-2016-7004740 dated Nov. 28, 2016 with English Translation.
Office Action for JP Patent Application No. 2012-252203 dated Dec. 20, 2016 with English Translation.

(56) References Cited

OTHER PUBLICATIONS

Office Action for JP Patent Application No. 2012-243480 dated Dec. 20, 2016 with English Translation.
Office Action for JP Patent Application No. 2012-229176 dated Dec. 27, 2016 with English Translation.
Office Action for JP Patent Application No. 2012-268649 dated Jan. 31, 2017 with English Translation.
Office Action for JP Patent Application No. 2012-054308 dated Feb. 7, 2017 with English Translation.
Final Office Action for JP Patent Application No. 2012-120173 dated Feb. 7, 2017 with English translation.
Japanese Office Action in Japanese Application No. 2016-051347, dated Feb. 14, 2017, 6 pages (English Translation).
Korean Office Action in Korean Application No. 10-2015-7005518, dated Mar. 20, 2017, 12 pages (English Translation).
Japanese Office Action in Japanese Application No. 2015-217421, dated Feb. 28, 2017, 6 pages (English Translation).
Japanese Office Action in Japanese Application No. 2013-028997, dated Mar. 21, 2017, 8 pages (English Translation).
International Search Report for International Application No. PCT/JP2017/000787, dated Mar. 28, 2017, 1 page.
Japanese Office Action in Japanese Application No. 2016-087027, dated Mar. 28, 2017, 9 pages (English Translation).
Japanese Office Action in Japanese Application No. 2016-097777, dated Mar. 21, 2017, 8 pages (English Translation).
Chinese Office Action in Chinese Application No. 201510148247.2, dated May 3, 2017, 39 pages (English Translation).
Japanese Office Action in Japanese Application No. 2016-114221, dated Jun. 13, 2017, English Translation.
Japanese Office Action in Japanese Application No. 2012-150941, dated May 9, 2017, English Translation.
Shimomura et al., "Vibration and Acoustic Characteristics of Cartilage Transducer," Acoustical Society of Japan, 2010 with Partial English Translation.
Rion Co. Ltd., "New-generation Vibration Level Meter Model VM-51," Acoustical Society of Japan, 1990 with Partial English Translation.
Japanese Office Action in Japanese Application No. 2013-106416, dated May 30, 2017, English Translation.
Japanese Office Action in Japanese Application No. 2012-197484, dated Jun. 13, 2017, English Translation.
Japanese Office Action in Japanese Application No. 2013-126623, dated Jun. 13, 2017, English Translation.
Office Action for Japanese Patent Application No. 2016-185559 dated Jul. 25, 2017 with English translation.
Office Action for Japanese Patent Application No. 2016-195560 dated Aug. 22, 2017 with English translation.
Office Action for Japanese Patent Application No. 2016-197219 dated Aug. 22, 2017_ with English translation.
Office Action for Japanese Patent Application No. 2016-197225 dated Aug. 22, 2017 with English translation.
Office Action for Japanese Patent Application No. 2013-186424 dated Sep. 26, 2017_with English translation.
Office Action for Japanese Patent Application No. 2013-195756 dated Sep. 26, 2017_with English translation.
Office Action for Japanese Patent Application No. 2013-173595 dated Oct. 10, 2017 (with English translation).
Fukumoto, M. and Sugimum, T., Fulltime-wear Interface Technology , NTT Technical Review, 8(1):77-81, (2003) (with English Translation).
Sasaki C, Crusoe Supplementary Class note Which Condensed the Function Called for, ASCII, 12 pages (2001) (Partial English Translation).
Japanese Patent Office; Office Action mailed in counterpart Japanese patent Application No. 2017-004233 dated Nov. 21, 2017 (with English-language translation).
Office Action mailed for KR Patent Application No. 10-2017-7019074 dated Oct. 13, 2017 with English Translation.
Office Action mailed for Japanese Patent Application No. 2013-227279 dated Oct. 17,2017 with English translation.
Office Action for Japanese Patent Application No. 2013-221303 dated Oct. 17, 2017 with English Translation.
Office Action for Japanese Patent Application No. 2013-237963 dated Nov. 7, 2017 with English Translation.
Office Action for Japanese Application No. 2017-004233 dated Nov. 21, 2017 with English Translation.
Office Action for Japanese Patent Application No. 2016-236604 dated Nov. 21, 2017 with English Translation.
Office Action for Japanese Patent Application No. 2014-010271 dated Nov. 28, 2017 with English Translation.
Office Action for Japanese Patent Application No. 2017-000580 dated Dec. 19, 2017 with English Translation.
Office Action for Korean Application No. 10-2016-7004740 dated Dec. 19, 2017 with English Translation.
Office Action for Japanese Patent Application No. 2013-221303 dated Dec. 26, 2017 with English Translation.
Office Action for Japanese Patent Application No. 2013-237963 dated Dec. 26, 2017 with English Translation.
International Search Report for International Application No. PCT/JP2016/070848, dated Sep. 9, 2016, 5 pages.
SIPO Patent Office, Chinese Patent Application No. 2014800584218 dated Jan. 3, 2018, with English translation.
Japan Patent Office, Office Action for Japanese Patent Application No. 2013-106416 dated Jan. 9, 2018 with English translation.
European Patent Office, EESR for European Patent Application No. 15834516 dated Mar. 12, 2018.
Japan Patent Office, Office Action for Japanese Patent Application No. 2016-202733 dated Mar. 13, 2018 with English translation.
European Patent Office, EESR for EP Application No. 16824527.2 dated Feb. 28, 2019.
European Patent Office. EESR for EP Application No. 16846372.7 dated Feb. 19, 2019.
Korean Intellectual Property Office, Office Action for Korean Application No. 10-2018-7014722 dated Dec. 26, 2018 with English Translation.
Korean Intellectual Property Office, Office Action for Korean Application No. 10-2018-7006763 dated Jan. 30, 2019 with English Translation.
Korean Intellectual Property Office, Office Action for Korean Application No. 10-2018-7034989 dated Mar. 4, 2019 with English Translation.
SIPO, Office Action for Chinese Application No. 201610520280.8 dated Jan. 3, 2019 with English Translation.
SIPO, Office Action dated Aug. 8, 2018 for Chinese application No. 201580044713.0 (with English translation).
Japan Patent Office, Office Action dated Oct. 23, 2018 for Japanese application No. 2015-012282 (with English translation).
Japan Patent Office, International Search Report for PCT/JP2016/076494 dated Nov. 29, 2016, with English translation.
Japan Patent Office, Office Action for JP 2015-141168, dated Jun. 4, 2019 with English Translation.
Korean Intellectual Property Office, Office Action for KR10-2019-7011539 dated Jun. 20, 2019 with English Translation.
Japan Patent Office, Office Action for JP2015-204396, dated Jul. 16, 2019 with English Translation.
Japan Patent Office, Office Action for JP 2015-082557 dated Jul. 30, 2019 with English Translation.
Japan Patent Office, Office Action for JP 2015-238764 dated Aug. 20, 2019 with English Translation.
China Intellectual Property Office, Office Action for China Appln. No. 201510131342.1, dated Nov. 4, 2019, with English translation.
European Patent Office, Summons to attend oral proceedings for EP Appln. No. 11853443.7, mailed Oct. 10, 2019.
Korea Intellectual Property Office, Office Action for Korean Application No. 10-2019-7025296, dated Sep. 20, 2019, with English translation.
Korea Intellectual Property Office, Office Action for Korean Appln No. 10-2018-7020853, dated Sep. 16, 2019, with English translation.
International Search Report and Written Opinion in PCT Application No. PCT/JP2019/037808, dated Nov. 12, 2019, 10 pages.

(56) References Cited

OTHER PUBLICATIONS

Korea Intellectual Property Office, Office Action for Korean Appln No. 10-2019-7011539, dated Dec. 25, 2019, 10 pages (with English translation).
Office Action in Chinese Appln. No. 201810640135.2, dated Jan. 21, 2020, 14 pages (with English translation).
Office Action in Japanese Appln. No. 2016-120820, dated Jan. 21, 2020, 6 pages (with English translation).
Office Action in Japanese Appln. No. 2016-202836, dated Mar. 24, 2020, 8 pages (with English translation).
European Extended Search Report for EP Application No. 18179998.2_dated Oct. 26, 2018.
Korean Intellectual Property Office, Office Action for counterpart KR Application No. 10-2017-7016517 dated Oct. 31, 2018 with English translation.
Japan Patent Office, Office Action for JP Application No. 2014-256091 dated Oct. 30, 2018 with English translation.

* cited by examiner

FIG.2
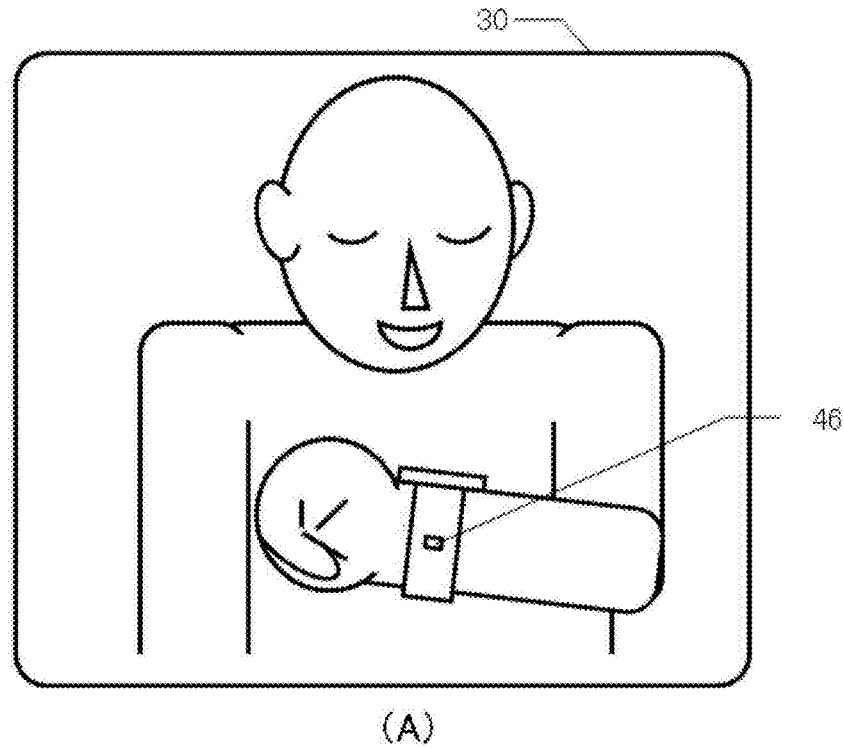
(A)
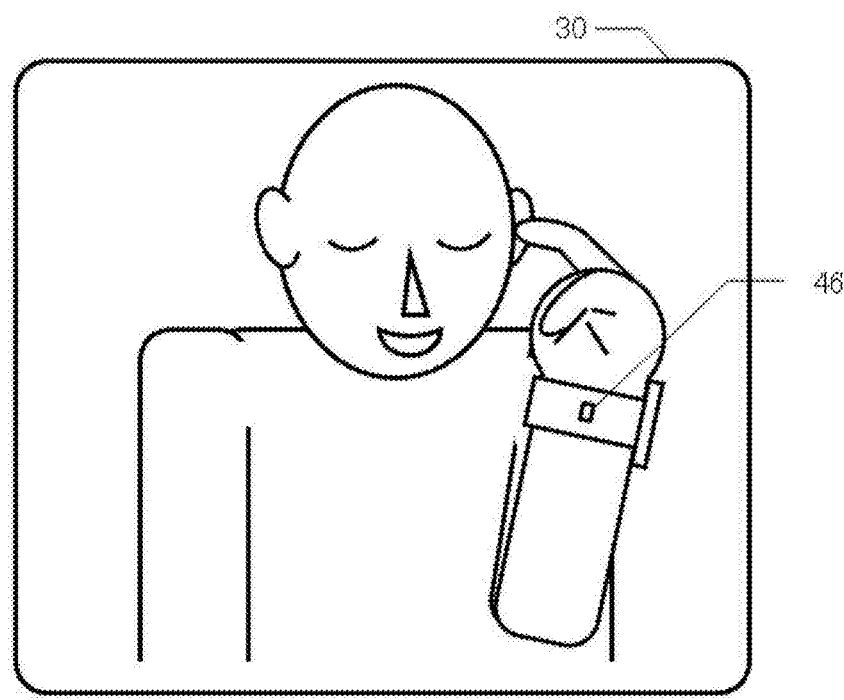
(B)

FIG.3
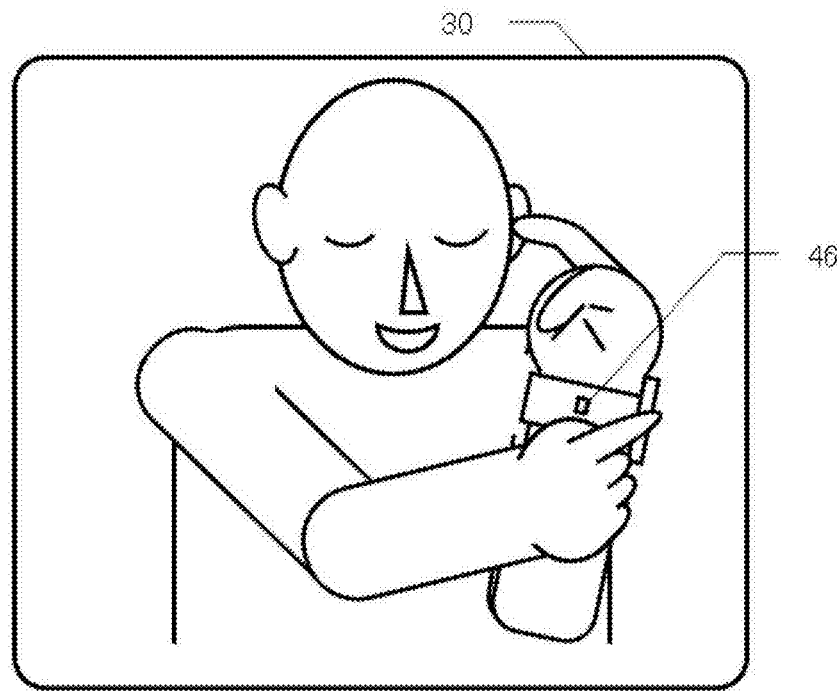
(A)
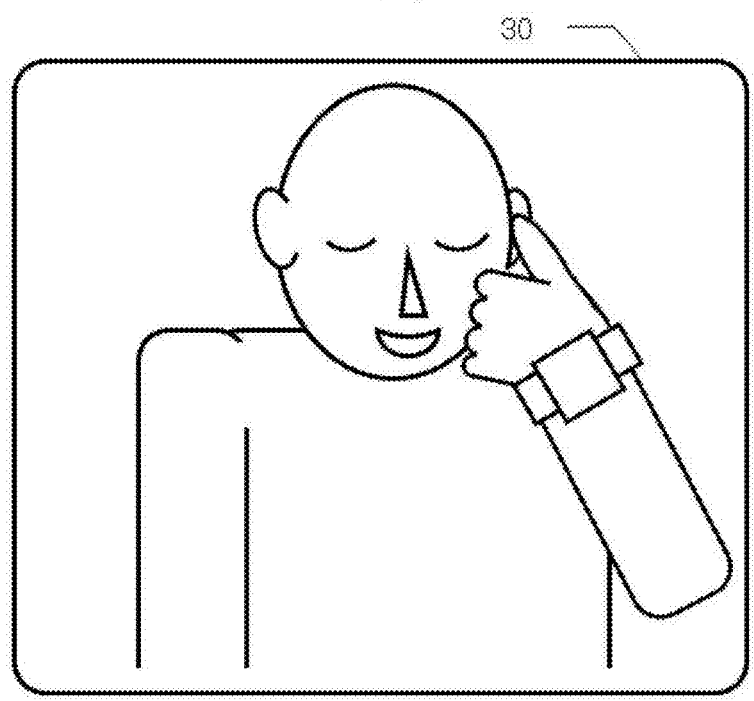
(B)

FIG.4
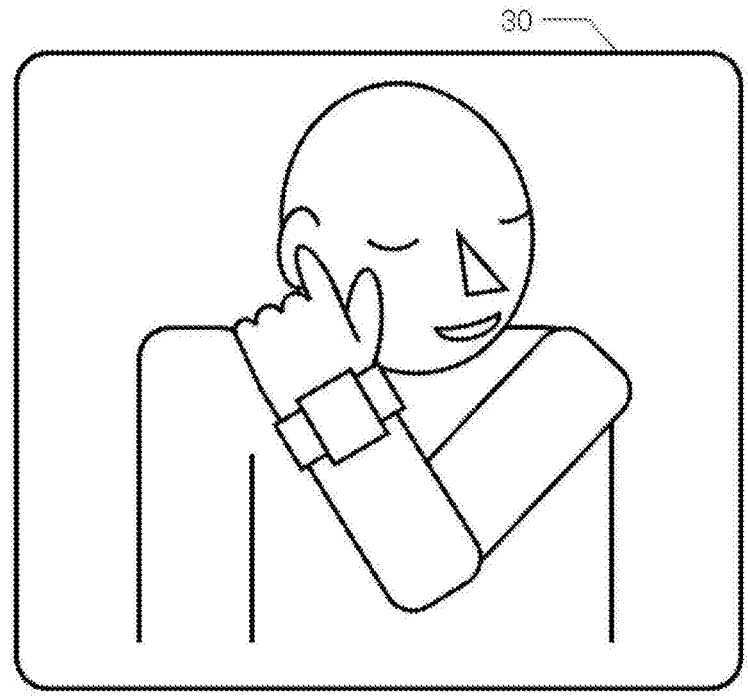
(A)
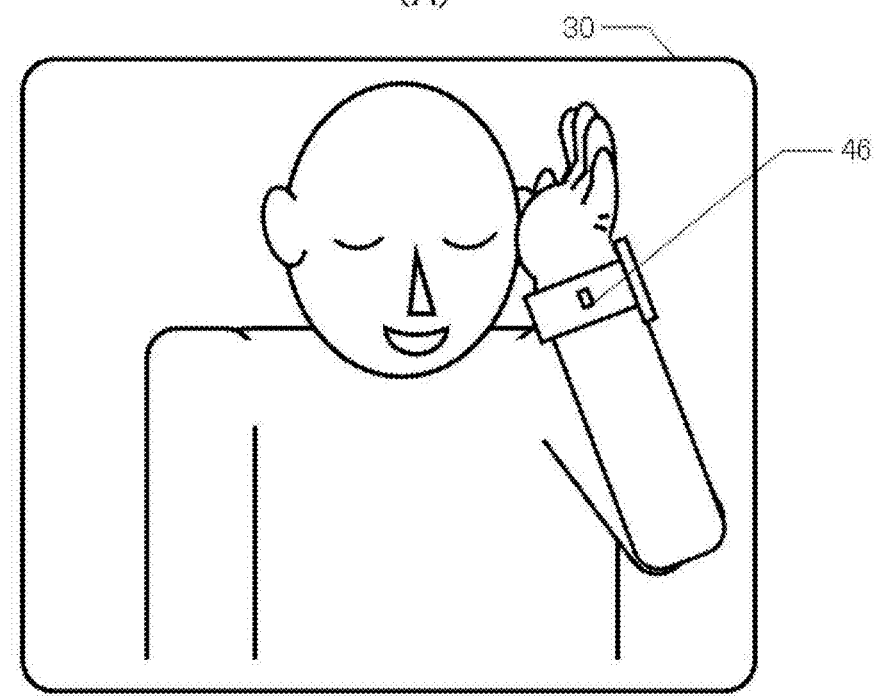
(B)

| WORN STATE | (A) | (B) | (C) | (D) |
|---|---|---|---|---|
| ARM | LEFT | RIGHT | LEFT | RIGHT |
| OPERATION PORTION | BACK OF HAND SIDE | BACK OF HAND SIDE | ELBOW SIDE | ELBOW SIDE |
| DISPLAY | UPRIGHT | UPSIDE DOWN | UPSIDE DOWN | UPRIGHT |
| CARTILAGE CONDUCTION VIBRATION SOURCE | 1ST | 2ND | 2ND | 1ST |
| AVERAGE GRAVITATIONAL ACCELERATION ON OPERATION PORTION | DOWNWARD | DOWNWARD | UPWARD | UPWARD |
| MOST FREQUENTLY OCCURRING TURNING ACCELERATION START PATTERN | DISPLAY ROTATES CLOCKWISE | DISPLAY ROTATES COUNTER-CLOCKWISE | DISPLAY ROTATES CLOCKWISE | DISPLAY ROTATES COUNTER-CLOCKWISE |

FIG.14
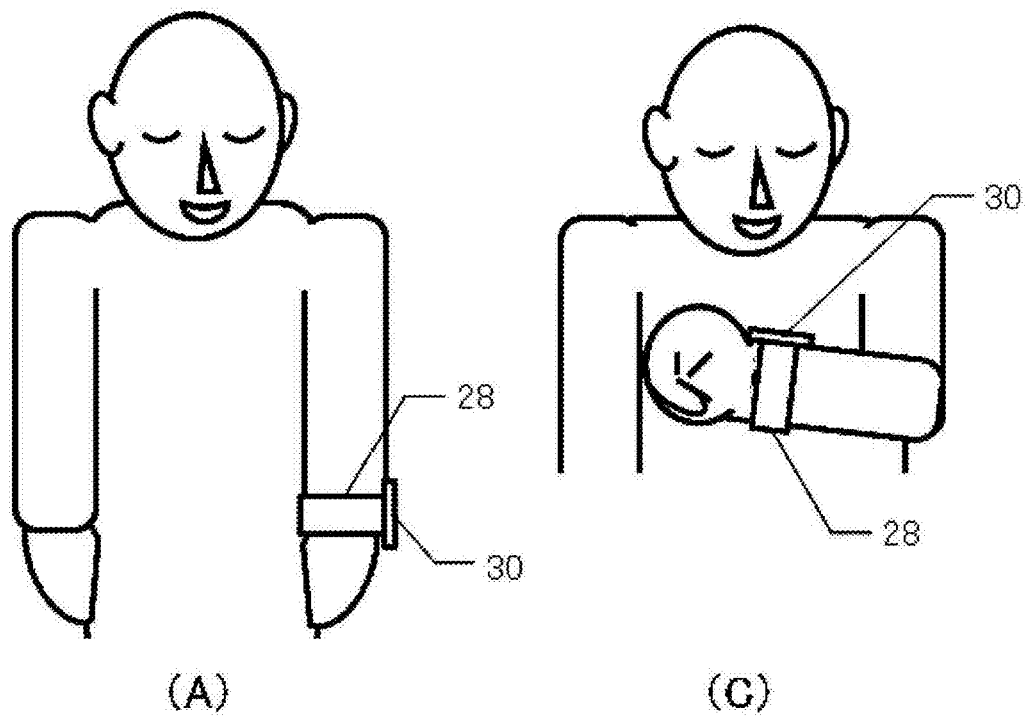
(A)  (C)
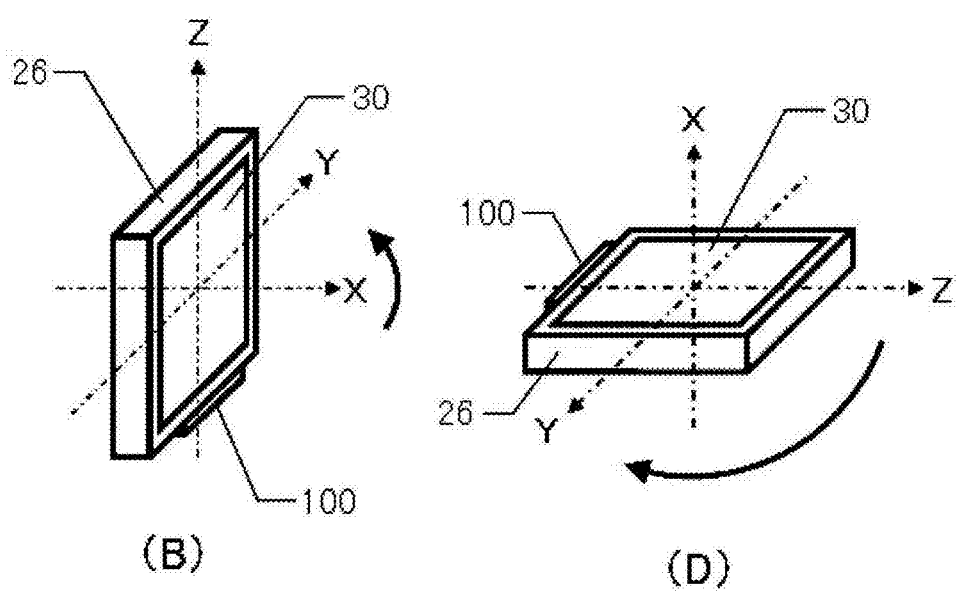
(B)  (D)

FIG.15
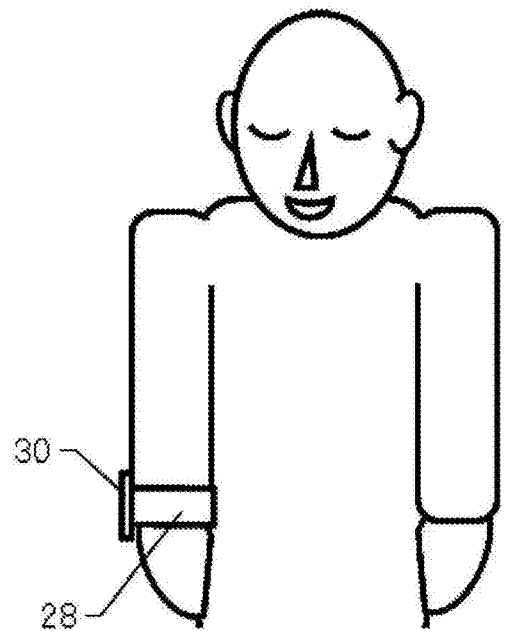
(A)
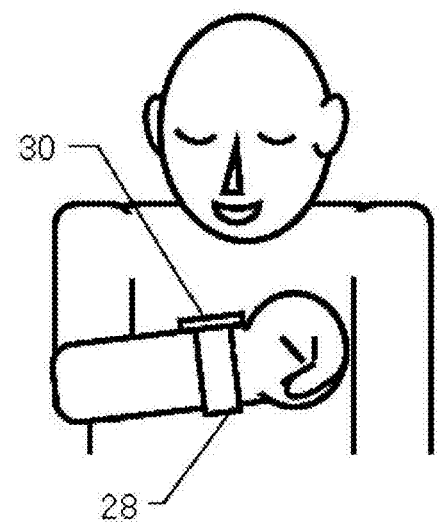
(C)
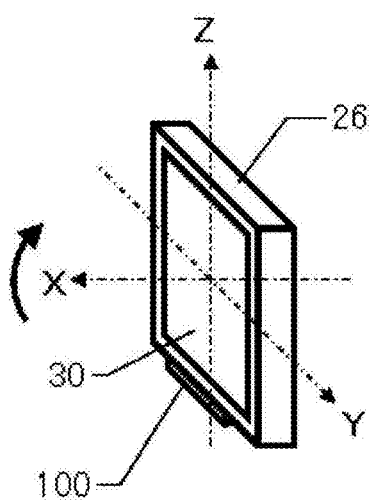
(B)
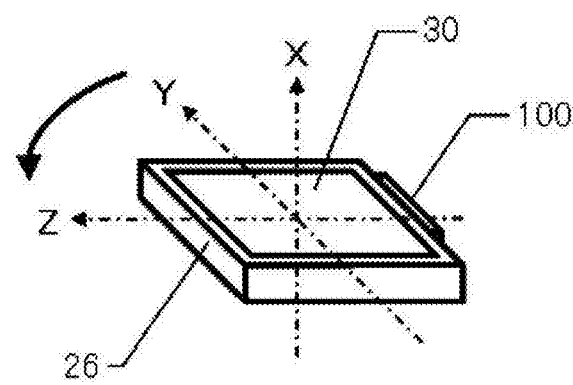
(D)

FIG.16
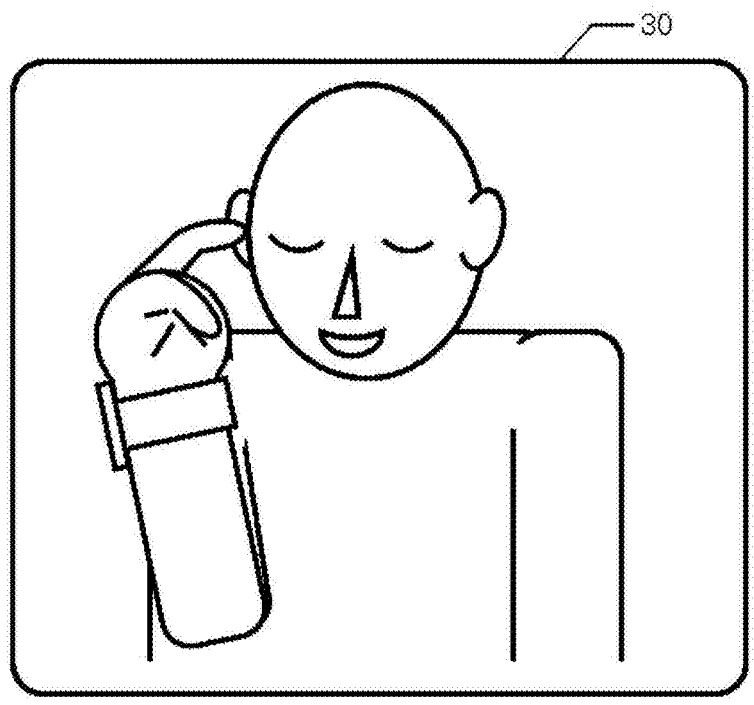
(A)
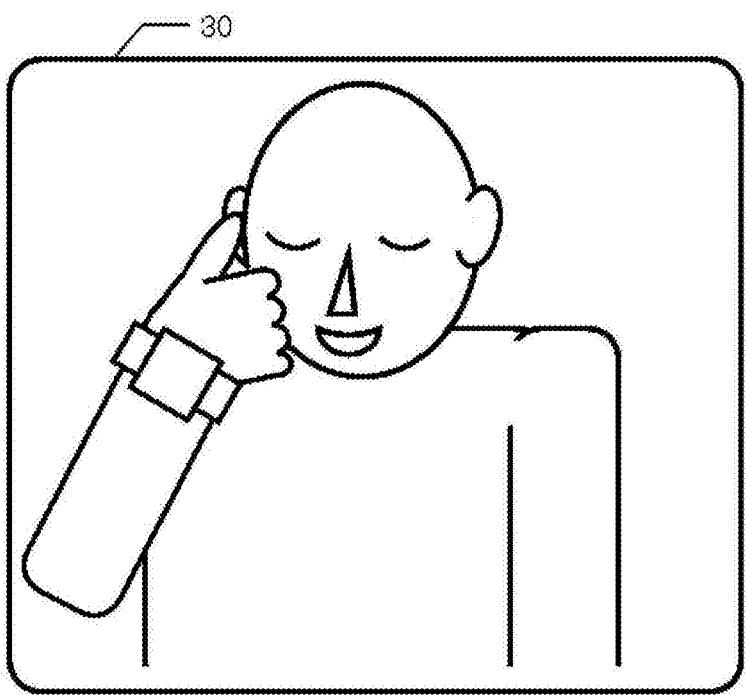
(B)

FIG.17
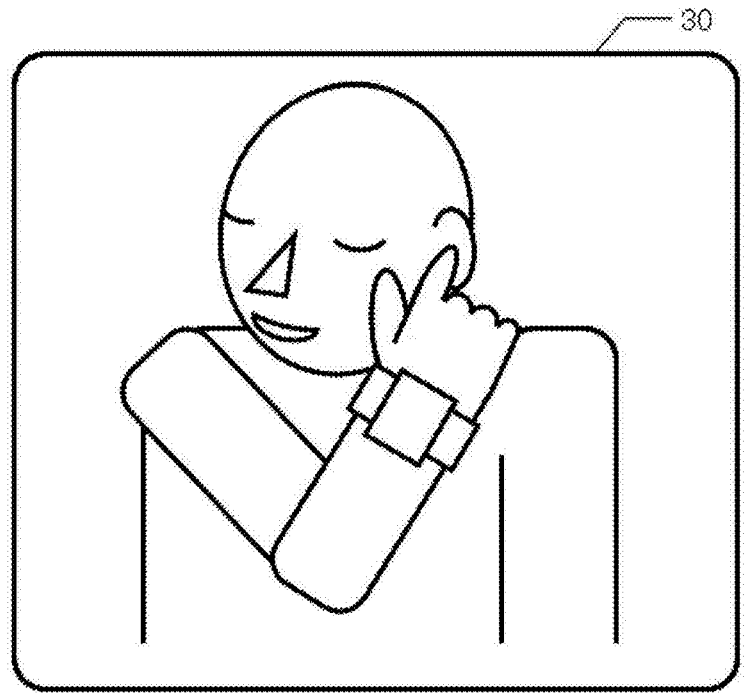
(A)
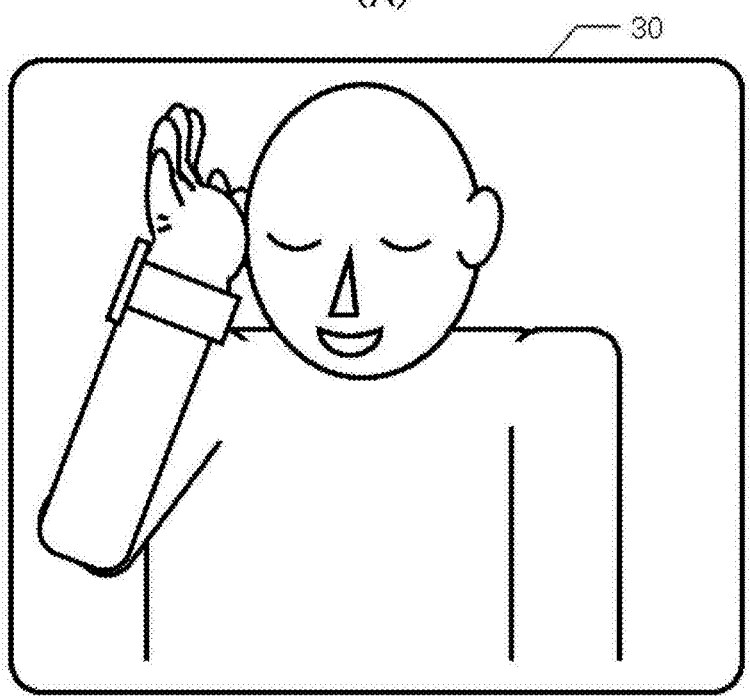
(B)

WRIST WATCH WITH HEARING FUNCTION

TECHNICAL FIELD

The present invention relates to wrist watches with hearing functions.

BACKGROUND ART

Various wrist watch-type handsets have been proposed. Patent Document 1 proposes conducting vibration generated by an actuator from a diaphragm to the human body and then conducting the vibration of the diaphragm from the wrist to a finger by bone conduction so that, with the finger put into the ear canal or the like, an acoustic signal can be heard (Patent Document 1). In Patent Document 2, the present inventors propose conducting vibration for cartilage conduction to the wrist from an arm cartilage conduction vibration source provided in a belt or the like of a wrist watch so that, with the forefinger, the thumb, or a lower part of the palm, to which the vibration is conducted, put on an ear cartilage, speech can be received by cartilage conduction (Patent Document 2).

LIST OF CITATIONS

Patent Literature

Patent Document 1: Japanese Patent Application Publication No. 2002-111822
Patent Document 2: Japanese Patent Application Publication No. 2015-82818

SUMMARY OF THE INVENTION

Technical Problem

However, with respect to handsets that achieve cartilage conduction via vibration of a hand, there still remain many issues to be addressed.

Against the background discussed above, one object of the present invention is to provide more effective wrist watches with hearing functions that achieve cartilage conduction via vibration of a hand.

Means for Solving the Problem

To achieve the above object, according to one feature of the present invention, a wrist watch with a hearing function includes: a display of which the up-down orientation as observed when the display is viewed is reversible; and vibration conducting parts for cartilage conduction provided, respectively, in parts of the wrist watch in contact with near a radius distal end and an ulna distal end when the wrist watch is worn. According to a specific feature, the wrist watch further includes an operation portion provided at a position close to the back of the hand when the wrist watch is worn.

According to another specific feature, the wrist watch further includes: an acceleration detector; a determiner which determines a direction in which the up-down orientation of the display is in an upright state based on the acceleration detected by the acceleration detector; and a display controller which decides the up-down orientation of the display based on a judgement by the determiner and which keeps the up-down orientation unchanged until another judgement against the judgement is made by the determiner. According to a more specific feature, the determiner determines the direction in which the up-down orientation of the display is in the upright state based on a relationship between the up-down orientation of the operation portion and the acceleration detected by the acceleration detector. According to yet another specific feature, the determiner determines whether the operation portion points up or down when the wrist watch is worn based on the average value of the gravitational acceleration detected by the acceleration detector, determines whether the wrist watch is worn on the right arm or the left arm based on the average value of the order and direction in which a turning movement occurs as detected by the acceleration detector, and determines, based on the combination of these, the direction in which the up-down orientation of the display is in the upright state.

According to yet another specific feature, in coordination with reversing of the up-down orientation of the display, whichever of the vibration conducting parts for cartilage conduction is located near the radius distal end is selectively vibrated. According to yet another specific feature, both of the vibration conducting parts for cartilage conduction provided, respectively, in parts of the wrist watch in contact with near the radius distal end and the ulna distal end are vibrated.

According to another feature, a wrist watch with a hearing function includes: a display of which the up-down orientation as observed when the display is viewed is reversible; an acceleration detector; a determiner which determines a direction in which the up-down orientation of the display is in an upright state based on acceleration detected by the acceleration detector; and a display controller which decides the up-down orientation of the display based on a judgement by the determiner and which keeps the up-down orientation unchanged until another judgement against the judgement is made by the determiner. According to a specific feature, the wrist watch further includes an operation portion located close to the back of the hand when the wrist watch is worn, wherein the determiner determines the direction in which the up-down orientation of the display is in the upright state based on a relationship between the up-down orientation of the operation portion and the acceleration detected by the acceleration detector.

According to another specific feature, the determiner determines whether the operation portion points up or down when the wrist watch is worn based on the average value of the gravitational acceleration detected by the acceleration detector, determines whether the wrist watch is worn on the right arm or the left arm based on the average value of the order and direction in which a turning movement occurs as detected by the acceleration detector, and determines, based on the combination of these, the direction in which the up-down orientation of the display is in the upright state. According to yet another specific feature, the determiner determines whether the operation portion points up or down when the wrist watch is worn based on the average value of the gravitational acceleration detected by the acceleration detector, determines whether the wrist watch is worn on the right arm or the left arm based on the average value of the order and direction in which a turning movement occurs as detected by the acceleration detector, and determines, based on the combination of these, the direction in which the up-down orientation of the display is in the upright state.

According to another feature, a wrist watch with a hearing function dedicated to the left hand and a wrist watch with a hearing function dedicated to the right hand include: a wrist watch dedicated to the left hand of which a display is seen in an upright state and of which an operation portion is located close to the back of the hand when the wrist watch is worn on the left arm; and a wrist watch dedicated to the right hand of which a display is seen in an upright state and of which an operation portion is located close to the back of the hand when the wrist watch is worn on the right arm. The wrist watch dedicated to the right hand and the wrist watch dedicated to the left hand are each provided with a vibration conducting part for cartilage conduction in a part in contact with near a radius distal end when the wrist watch is worn.

According to another feature, a wrist watch with a hearing function dedicated to the right hand includes: a display seen in an upright state when the wrist watch is worn on the right arm; an operation portion located close to the back of the hand when the wrist watch is worn on the right arm; and a cartilage conduction vibration conducting part arranged in a part of the wrist watch in contact with near a radius distal end of the right arm when the wrist watch is worn on the right arm.

Advantageous Effects of the Invention

According to the present invention, it is possible to provide more effective wrist watches with hearing functions.

BRIEF DESCRIPTION OF DRAWINGS

FIG. 2 is a diagram showing screens displayed on a watch display to explain call-conducting postures in Embodiment 1;

FIG. 3 is a diagram showing other screens displayed on a watch display to explain call-conducting postures in Embodiment 1;

FIG. 4 is a diagram showing still other screens displayed on a watch display to explain call-conducting postures in Embodiment 1;

FIG. 13 is a table summarizing, based on the description given with reference to FIG. 12, the relationship among an arm, an operation portion, a display, and a cartilage conduction vibration source used in the various worn states shown in FIG. 12;

FIG. 14 is a diagram illustrating, with respect to the left arm, the concept of the automatic recognition of the orientation of an operation portion and the wearing arm;

FIG. 15 is a diagram illustrating, with respect to the right arm, the concept of the automatic recognition of the orientation of an operation portion and the wearing arm;

FIG. 16 is a diagram showing screens displayed on a watch display to explain call-conducting postures with respect to the right arm;

FIG. 17 is a diagram showing other screens displayed on a watch display to explain call-conducting postures with respect to the right arm;

DESCRIPTION OF EMBODIMENTS

Embodiment 1

Figure 1:
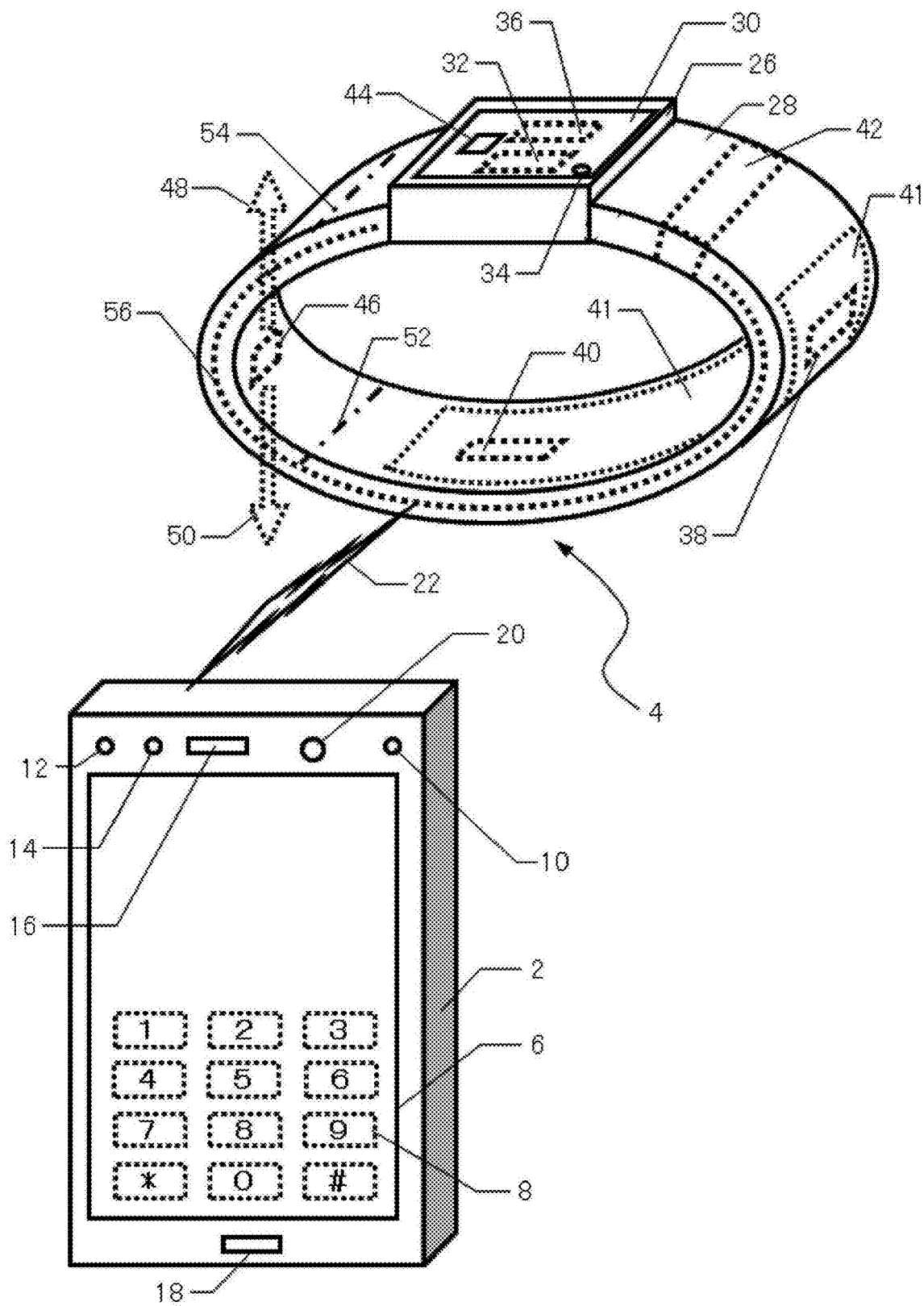
FIG. 1 is a perspective view showing a system configuration of a first embodiment (Embodiment 1) of the present invention.

FIG. 1 is a perspective view showing a system configuration according to a first embodiment, Embodiment 1, of the present invention. Embodiment 1 is an excerpt from Patent Document 2 mentioned above, and constitutes part of the present invention. Embodiment 1 is configured as a system comprising a mobile telephone 2 and a wrist watch-type handset 4. The mobile telephone 2 is configured as a so-called smartphone having a display 6 with GUI (graphical user interface) capabilities. An operation panel 8 including a numeric keypad is displayed on the display 6, and is operated on a GUI basis through touching and sliding operations on the display 6 with a finger. Infrared light emitters 10 and 12 and an infrared light receiver 14 constitute a proximity sensor for detecting the mobile telephone 2 being put on the ear. The mobile telephone 2 further includes an earphone 16, a microphone 18, and a front videophone camera 20. The mobile telephone 2 also includes a rear main camera, though not illustrated in FIG. 1, behind the display 6, and can communicate with the wrist watch-type handset 4 by near-field communication (NFC) using a radio wave 22 of a near-field communication system such as Bluetooth (a registered trademark). The mobile telephone 2 further includes a speaker for sounding ringtones and for delivering videophone sound, and for distinction from it, the other speaker on which the ear is put is referred to as the "earphone 16" as mentioned above.

The wrist watch-type handset 4 has a wrist watch body 26 and a belt 28. The wrist watch body 26 is provided with a watch display 30 comprising a reflective liquid crystal display device, and provides ordinary time display as well as various other kinds of display as will be described later. The watch display 30, of a touch panel-type, has a touch panel 30a on its display surface, and allows the user to operate the wrist watch-type handset 4. The wrist watch body 26 is provided with a handset speaker 32, and communicates with the mobile telephone 2 by near-field communication to allow the user to engage in a telephone call while viewing the wrist watch-type handset 4 even with the mobile telephone 2 stuck in, for example, a picket. A handset microphone will be described later. The wrist watch body 26 is further provided with a camera 34, which shoots the face of the user him or herself viewing the watch display 30 while the face of the person at the other side is displayed on the watch display 30, allowing the user to engage in a videophone call.

The wrist watch body 26 is provided with a cartilage conduction vibration source 36 comprising a piezoelectric bimorph element or the like, so that vibration for cartilage conduction is conducted from the reverse side of the wrist watch body 26 to the wrist. Likewise, the belt 28 too is provided with cartilage conduction vibration sources 38 and 40 each comprising a piezoelectric bimorph element or the like, so that vibration for cartilage conduction is conducted from the reverse side of the belt 28 to the wrist. The belt 28 is also provided with a conducting segment 41, which is formed of a material having an acoustic impedance close to that of the wrist, and the cartilage conduction vibration sources 38 and 40 are arranged on or in the conducting segment 41, so that their vibration conducts via the conducting segment 41. Thus, from the wrist watch-type handset 4, vibration for cartilage conduction is conducted over a large area around the wrist. A configuration like this, in which vibration is conducted from around the wrist over a large area, is effective in absorbing differences in the position suitable for vibration conduction among individual users, displacements of the wrist watch-type handset 4 while it is being worn, and so forth. Conducting vibration from around the wrist over a large area also helps conduct vibration for cartilage conduction to the arm more effectively.

Now, cartilage conduction will be explained. Cartilage conduction is a phenomenon discovered by the present inventors, and denotes the phenomenon in which vibration conducted to the cartilage around the entrance of the ear canal, such as that in the tragus, makes the surface of the cartilage part of the ear canal vibrate, producing air-conducted sound inside the ear canal. The air-conducted sound produced inside the ear canal travels on deeper into it to reach the eardrum. Thus, the greater part of the sound heard by cartilage conduction is the sound heard via the eardrum. However, here, the sound heard via the eardrum is not ordinary air-conducted sound, i.e., sound that has entered the ear canal from outside it, but air-conducted sound that is produced inside the ear canal.

The cartilage conduction vibration sources double as a vibration source for an incoming-call vibrator, and serve to notify an incoming call by conducting vibration to the wrist by vibrating when fed with an incoming call signal by near-field communication with the mobile telephone 2. As will be described later, for cartilage conduction, the cartilage conduction vibration sources are vibrated in a frequency range of an audio signal (frequencies around 1000 Hz), and the vibration is conducted to the wrist with a frequency range that arouses the sense of vibration (e.g., 20 Hz or less) cut off so that no uncomfortable vibration may be sensed at the wrist. On the other hand, when vibrated as an incoming-call vibrator, the cartilage conduction vibration sources are vibrated around a frequency that arouses the sense of vibration (e.g., 20 Hz or less), with an audible frequency range cut off so that the vibration may not be heard by someone around.

The belt 28 is provided with a tightening mechanism 42, which allows the user to loosen the belt 28 when wearing or removing the wrist watch-type handset 4, and to tighten the belt 28 to keep the wrist watch-type handset 4 in a normal worn state. With the tightening mechanism 42, the user can tighten the belt 28 further from the normal state within a range in which the user does not feel pain or discomfort to more reliably obtain cartilage conduction to the wrist. Such switching from the normal state to the cartilage conduction state by the tightening mechanism 42 can be made to take place by the user making a touch panel operation, pressing a switch 44 displayed on the watch display 30. The user's action to press the switch 44 involves pressing the wrist watch body 26 onto the wrist, and thus serves as an action to bring the vibration of the cartilage conduction vibration source 36 in closer contact with the wrist. Needless to say, so long as sufficient cartilage conduction is obtained in the normal worn state, the user can conduct a call without pressing the switch 44.

The belt 28 is further provided with a variable-directivity microphone 46 for the handset. In the videophone mode mentioned above, as indicated by an arrow 48, the directivity of the variable-directivity microphone 46 is directed toward the back of the hand, so as to collect sound from in front of the watch display 30. On the other hand, during a telephone call using cartilage conduction, as indicated by an arrow 50, the directivity of the variable-directivity microphone 46 is so switched as to collect sound from the direction of the palm of the hand (typically the left hand) on which the wrist watch-type handset 4 is worn. This permits the user to conduct a telephone call in a posture as will be described later. The belt 28 is provided with vibration-isolating segments 52 and 54, which are formed of a material having a different acoustic impedance than mentioned above, so that vibration from the cartilage conduction vibration sources 36, 38, and 40 may not conduct to the variable-directivity microphone 46. Along the belt 28, an antenna 56 is provided so as to be wound around the wrist.

FIG. 2 is a diagram showing screens displayed on the watch display 30 to explain call-conducting postures in Embodiment 1 shown in FIG. 1. These screens are displayed each time the power switch of the wrist watch-type handset 4 is turned ON, but if that is annoying, a setting is also possible to skip those screens. FIG. 2(A) shows a screen explaining a call-conducting posture for a videophone call, in which posture the user conducts a videophone call while viewing the watch display 30 with the mobile telephone 2 placed in, for example, a pocket. In this posture, the directivity of the variable-directivity microphone 46 is directed toward the back of the hand as indicated by the arrow 48 in FIG. 1.

FIG. 2(B) shows a screen explaining a posture for a cartilage-conduction call, in which posture the user conducts a telephone call with the forefinger of the hand (e.g., the left hand) on which the wrist watch-type handset 4 is worn put on the tragus (ear cartilage) of the ear (e.g., the left ear) on the same side. In this posture, so long as the finger does not close the earhole, the user can hear cartilage-conducted sound while also hearing outside sound. Incidentally, by pressing the tragus so hard as to close the earhole, the user can hear cartilage-conducted sound louder due to a closed ear canal effect. In this call-conducting posture, the vibration for cartilage conduction that is introduced at the wrist conducts to the forefinger, whose vibration then conducts to the tragus (ear cartilage). The user can thus hear the other side's voice well by cartilage conduction, while the user's own voice is conveyed to the other side by being collected by the variable-directivity microphone 46 which has its directivity directed toward the palm of the hand as indicated by the arrow 50 in FIG. 1. In this posture, the camera 34, the handset speaker 32, and the watch display 30 are kept OFF. These are automatically turned OFF in response to an acceleration sensor provided in the wrist watch body 26 detecting a change in posture from FIG. 2(A) to FIG. 2(B).

FIG. 3 is a diagram showing other screens displayed on the watch display 30 to explain call-conducting postures in Embodiment 1 shown in FIG. 1. FIG. 3(A) shows a screen explaining how, in the cartilage-conduction posture shown in FIG. 2(B), the user can press the switch 44 shown in FIG. 1 with the right hand. FIG. 3(B) shows a screen explaining another posture using cartilage conduction, in which posture the user puts the thumb of the hand (e.g., the left hand) on which the wrist watch-type handset 4 is worn on the tragus (ear cartilage) of the ear (e.g., the left ear) on the same side. Also in this call-conducting posture, the user's own voice can be conveyed to the other side by being collected by the variable-directivity microphone 46 which has its directivity directed toward the palm of the hand.

FIG. 4 is a diagram showing still other screens displayed on the watch display 30 to explain call-conducting postures in Embodiment 1 shown in FIG. 1. FIG. 4(A) shows a screen explaining a call-conducting posture relying on cartilage conduction in which the user holds the arm (e.g., the left arm) on which the wrist watch-type handset 4 is worn across the face to put the forefinger on the tragus (ear cartilage) of the ear (e.g., the right ear) on the opposite side. FIG. 4(B) shows a screen explaining yet another call-conducting posture relying on cartilage conduction in which the user puts the bulge in a lower part of the palm of the hand (e.g., the left hand) on which the wrist watch-type handset 4 is worn on the ear (e.g., the left ear) on the same side. In this case, the bulge on the palm makes contact with the cartilage around the earhole over a large area. By hard pressing, the earhole can be closed. In both of the postures shown in FIGS. 4(A) and 4(B), the user's own voice can be conveyed to the other side by being collected by the variable-directivity microphone 46 which has its directivity directed toward the palm of the hand.

Figure 5:
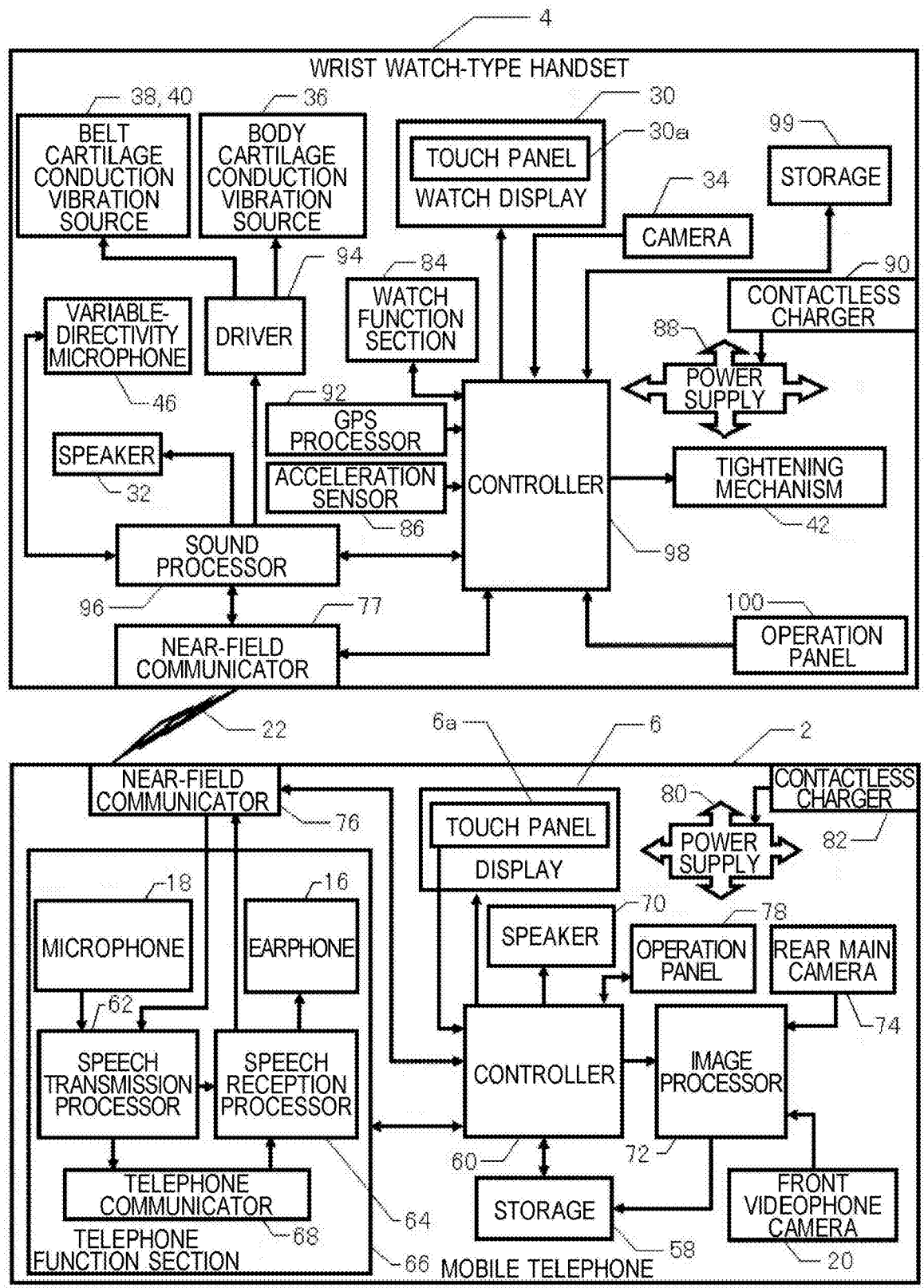
FIG. 5 is a block diagram of Embodiment 1.

FIG. 5 is a block diagram of Embodiment 1 shown in FIG. 1; there, such parts as appear also in FIG. 1 are identified by common reference signs, and no overlapping description will be repeated unless necessary. The mobile telephone 2 is controlled by a controller 60, which operates according to a program stored in a storage 58. The storage 58 also can temporarily store data needed for the control by the controller 60, and can store various kinds of measurement data and images. The display 6 provides display based on display data held in a display driver, under the control of the controller 60. The display 6 has a display backlight, of which the brightness the controller 60 adjusts according to the ambient illumination. The display 6 has a touch panel, so that by touching the display 6, the user can operate the mobile telephone 2.

A speech transmission processor 62, a microphone 18, a speech reception processor 64, and an earphone 16 constitute a telephone function section 66, which can connect to a wireless communication network via a telephone communicator 68, which is under the control of the controller 60. Under the control of the controller 60, a speaker 70 sounds ringtones, offers various kinds of audible guidance, and delivers the other side's voice during a videophone call. The audio delivered from the speaker 70 is not delivered from the earphone 16. Under the control of the controller 60, an image processor 72 processes the images shot by the front videophone camera 20 and the rear main camera 74, and feeds the processed images to the storage 58.

The mobile telephone 2 includes a near-field communicator 76 for communication with the wrist watch-type handset 4, and an operation panel 78 including, among others, a main switch for turning ON and OFF the main power. The entire mobile telephone 2 is supplied with electric power from a power supply 80, which has a rechargeable battery, which is charged by a contactless charger 82.

The wrist watch-type handset 4 includes a near-field communicator 77 for communication with the mobile telephone 2. The wrist watch-type handset 4 also includes a watch function section 84 for ordinary watch functions. An acceleration sensor 86 detects upward movement of the wrist watch-type handset 4 from FIG. 1(A) to (B) and downward movement of the wrist watch-type handset 4 from FIG. 1(B) to (A) to automatically switch the camera 34, the handset speaker 32, and the watch display 30 accordingly.

A power supply 88 of the wrist watch-type handset 4 and the power supply 80 of the mobile telephone 2 can be charged in a contactless fashion by the contactless charger 82 and a contactless charger 90 respectively. The wrist watch-type handset 4 and the mobile telephone 2 share information on each other's charge status by near-field communication to achieve coordination between them. Moreover, a GPS processor 92 detects movement of the user who is wearing the wrist watch-type handset 4, and each time it does, it checks whether or not the mobile telephone 2 is left behind without being carried around, thereby to secure coordination between the wrist watch-type handset 4 and the mobile telephone 2. Specifically, the GPS processor 92 checks whether or not the mobile telephone 2 has moved out of the near-field communication range as a result of the user's movement.

A driver 94 drives the cartilage conduction member 36 of the wrist watch body 26 and the cartilage conduction members 38 and 40 of the belt 28 all together to conduct vibration for cartilage conduction from around the wrist over a large area. In response to an instruction from a controller 98, a sound processor 96 switches whether to make the driver 94 generate vibration for cartilage conduction or to make the speaker 32 generate air-conducted sound. In response to an instruction from the controller 98 via the sound processor 96, the variable-directivity microphone 46 switches its directivity. The sound processor 96 also switches whether to make the driver 94 output an audio signal having a frequency range arousing the sense of vibration cut off or a vibration signal arousing the sense of vibration and having an audible frequency range cut off. The controller 98 operates according to a program stored in a storage 99. The storage 99 also can temporarily store data needed for the control by the controller 98, and can store various kinds of measurement data and images.

An operation panel 100 includes a button or the like for turning ON the main power, originating a call, and responding to a call. The watch display 30 is of a touch panel type as mentioned earlier, and has a touch panel 30a, on which the switch 44 or the like is displayed. By touching the watch display 30, the user can operate the mobile telephone 2.

Figure 6:
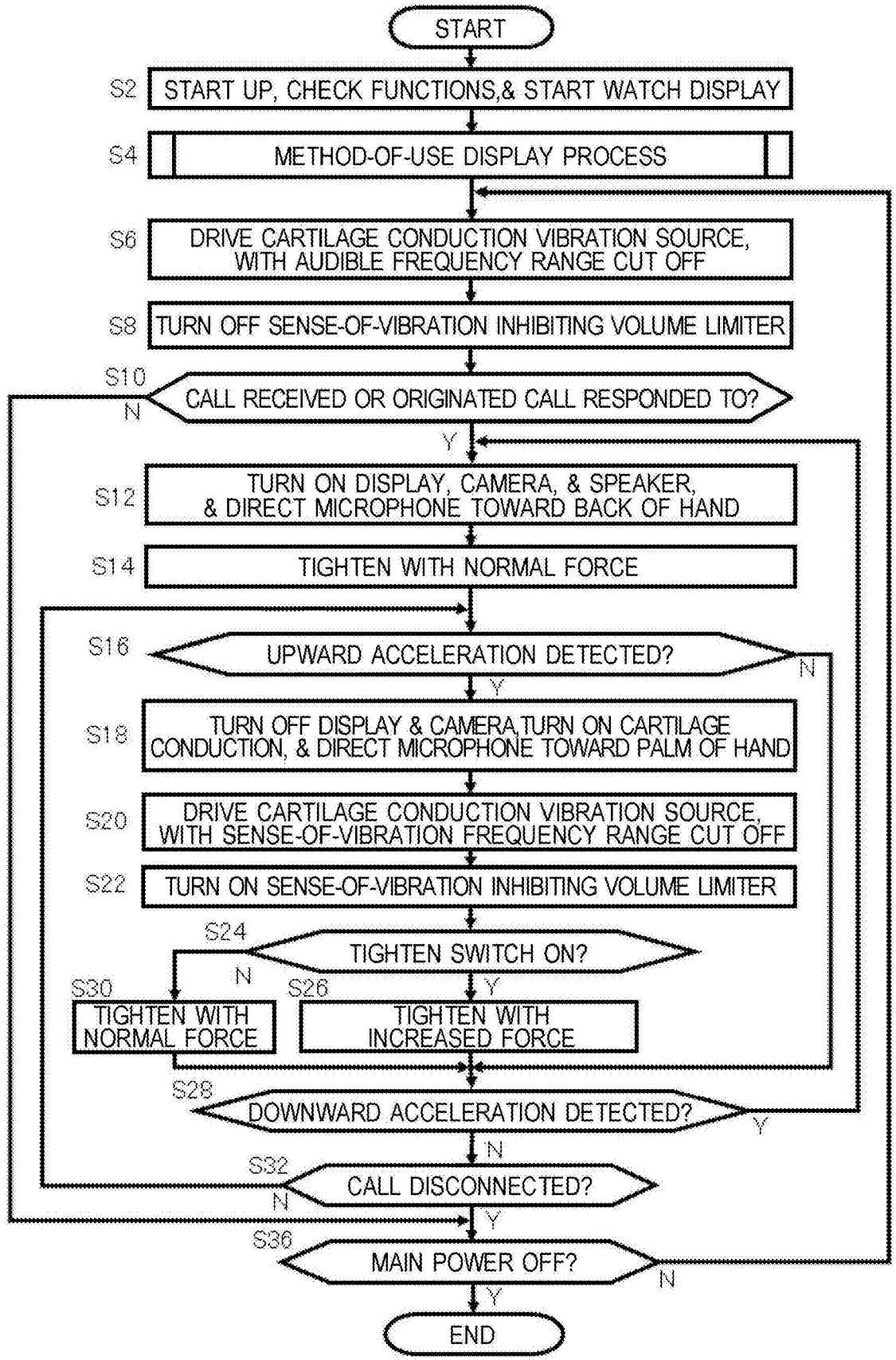
FIG. 6 is a flow chart showing the function of a wrist watch-type handset in Embodiment 1.

FIG. 6 is a flow chart showing the function of the controller 98 of the wrist watch-type handset 4 in Embodiment 1. The flow in FIG. 6 focuses on operation for functions related to cartilage conduction; in reality, the wrist watch-type handset 4 involves operation of the controller 98 that does not appear in the flow in FIG. 6, such as for ordinary wrist watch functions for instance. Specifically, FIG. 6 focuses on, among functions related to cartilage conduction, those for controlling the directivity of the variable-directivity microphone 46, for switching between a frequency range arousing the sense of vibration and an audible frequency range, and for controlling the tightening of the belt 28. To avoid complication, the other functions that have been described with reference to FIGS. 1 to 5 are also omitted from illustration and description.

The flow in FIG. 6 starts when the main power is turned ON on the operation panel 100 of the wrist watch-type handset 4. At Step S2, a start-up procedure is gone through, the functions of relevant blocks are checked, and ordinary watch display on the watch display 30 is started. Next, at Step S4, explanations of different methods of use as shown in FIGS. 2 to 4 are presented in a slide show. On completion of the explanations, the flow proceeds to Step S6.

At Step S6, to make the cartilage conduction vibration sources 36, 38, and 40 vibrate chiefly around a frequency that arouse the sense of vibration (e.g., 20 Hz or less) so that the incoming-call vibration may be not heard by someone around, the circuit is so switched as to cut off an audible frequency range from the driving signal, the flow then proceeding to Step S8. At this time, the cartilage conduction vibration sources 36, 38, and 40 are not yet driven. If Step S6 is reached with an audible frequency range already cut off, nothing is done at Step S6, and the flow proceeds to Step S8.

At Step S8, a sense-of-vibration inhibiting volume limiter is turned OFF, and the flow proceeds to Step S10. As will be described later, the sense-of-vibration inhibiting volume limiter is a limiter that operates, when the cartilage conduction vibration sources 36, 38, and 40 are vibrated in an audible frequency range, to keep the sound volume under a predetermined level to prevent vibration in a low-frequency range that is not completely cut off from arousing an uncomfortable sense of vibration. The sense-of-vibration inhibiting volume limiter is provided in the sound processor 96. When the cartilage conduction vibration sources 36, 38, and 40 are vibrated as an incoming-call vibrator, the vibration is meant to arouse the sense of vibration. Accordingly, then, the sense-of-vibration inhibiting volume limiter is turned OFF, so that the sound volume can be raised to the maximum. If Step S8 is reached with the sense-of-vibration inhibiting volume limiter in an OFF state, nothing is done at Step S8, and the flow proceeds to Step S10.

At Step S10, it is checked whether or not the operation panel 100 of the wrist watch-type handset 4 has been operated in response to an incoming-call signal delivered from the mobile telephone 2 by near-field communication, or whether or not a call-originating operation made on the operation panel 100 of the wrist watch-type handset 4 has been delivered to the mobile telephone 2 by near-field communication and a notice that the other side has responded to it has been delivered from the mobile telephone 2 by near-field communication. In a case where an incoming-call signal has been delivered, the cartilage conduction vibration sources 36, 38, and 40 are vibrated as an incoming-call vibrator; here, these are vibrated with an audible frequency range cut off on the basis of the operation at Step S6. If an operation responding to the incoming call has been made on the operation panel 100, or if the call originated from the mobile telephone 2 has been responded to, this means that the mobile telephone 2 has started a call with the other side, and thus the flow proceeds to Step S12.

At Step S12, the display of the other side's face on the watch display 30, the shooting of the user's own face by the camera 34, and the generation of air-conducted sound by the speaker 32 are all turned ON, and in addition the directivity of the variable-directivity microphone 46 is directed toward the back of the hand, the flow then proceeding to Step S14. At this time, the cartilage conduction vibration sources 36, 38, and 40 are OFF. If Step S12 is reached already with the watch display 30 ON, the camera 34 ON, the speaker 32 ON, and the directivity of the variable-directivity microphone 46 directed toward the back of the hand, nothing is done at Step S12, and the flow proceeds to Step S14. Next, at Step S14, the belt 28 is brought into a normal tightened state, and the flow proceeds to Step S16. If Step S14 is reached with the belt 28 already in a normal tightened state, nothing is done at Step S14, and the flow proceeds to Step S16. In this way, a call is started initially in a videophone mode, with the belt 28 in a normal tightened state. In the case of a voice-only call instead of a videophone call, out of the operations mentioned above, the display of the other side's face and the turning ON of the camera 34 are omitted.

At Step S16, it is checked whether or not the acceleration sensor 86 has detected upward movement of the wrist watch-type handset 4 from FIG. 2(A) to (B). If so, then, at Step S18, the display of the other side's face on the watch display 30, the shooting of the user's own face by the camera 34, and the generation of air-conducted sound by the speaker 32 are all turned OFF, and instead the cartilage conduction vibration sources 36, 38, and 40 are turned ON. In addition, the directivity of the variable-directivity microphone 46 is directed toward the palm of the hand, and the flow proceeds to Step S18. If Step S18 is reached already with the watch display 30 OFF, the camera 34 OFF, the cartilage conduction vibration sources 36, 38, and 40 ON, and the directivity of the variable-directivity microphone 46 directed toward the palm of the hand, nothing is done at Step S18, and the flow proceeds to Step S20.

At Step S20, the cartilage conduction vibration sources 36, 38, and 40 are vibrated in a frequency range of an audio signal (frequencies around 1000 Hz), with frequencies arousing the sense of vibration (e.g., 20 Hz or less) cut off so that no uncomfortable vibration may be sensed at the wrist, and the flow proceeds to Step S22. If Step S20 is reached with a sense-of-vibration arousing frequency range already cut off, nothing is done at Step S20, and the flow proceeds to Step S22. At Step S22, the sense-of-vibration inhibiting volume limiter mentioned earlier is turned ON, and the flow proceeds to Step S24. If Step S22 is reached with the sense-of-vibration inhibiting volume limiter already ON, nothing is done at Step S22, and the flow proceeds to Step S24.

At Step S24, whether or not the switch 44 is being pressed is checked. If so, then, at Step S26, the tightening force of the belt 28 is increased, and the flow proceeds to Step S28. On the other hand, if the switch 44 is not detected being pressed, then, at Step S30, the ordinary tightening force is restored, and the flow proceeds to Step S28.

At Step S28, it is checked whether or not the acceleration sensor 86 has detected downward movement of the wrist watch-type handset 4 from FIG. 2(B) to (A), and if so, then at Step S12, the videophone mode is restored. On the other hand, if, at Step S28, no downward movement is detected (this state persists so long as a cartilage conduction call continues), the flow proceeds to Step S32, where whether or not the call has been disconnected is checked. If the call has not been disconnected, the flow returns to Step S16. Thereafter, until the call is detected having been disconnected at Step S32, Steps S12 through S32 are repeated, so that switching between a cartilage-conduction call and a videophone call is performed to cope with change in posture, and the tightening force is changed according to whether or not the switch 44 is operated. If, at Step S32, the call is detected having been disconnected, the flow proceeds to Step S36.

At Step S36, it is checked whether or not the main power of the wrist watch-type handset 4 has been turned OFF. If not, the flow returns to Step S6, and thereafter, until the main power is detected having been turned OFF, Steps S6 through S36 are repeated. On the other hand, if, at Step S36, the main power is detected having been turned OFF, the flow ends.

Figure 7:
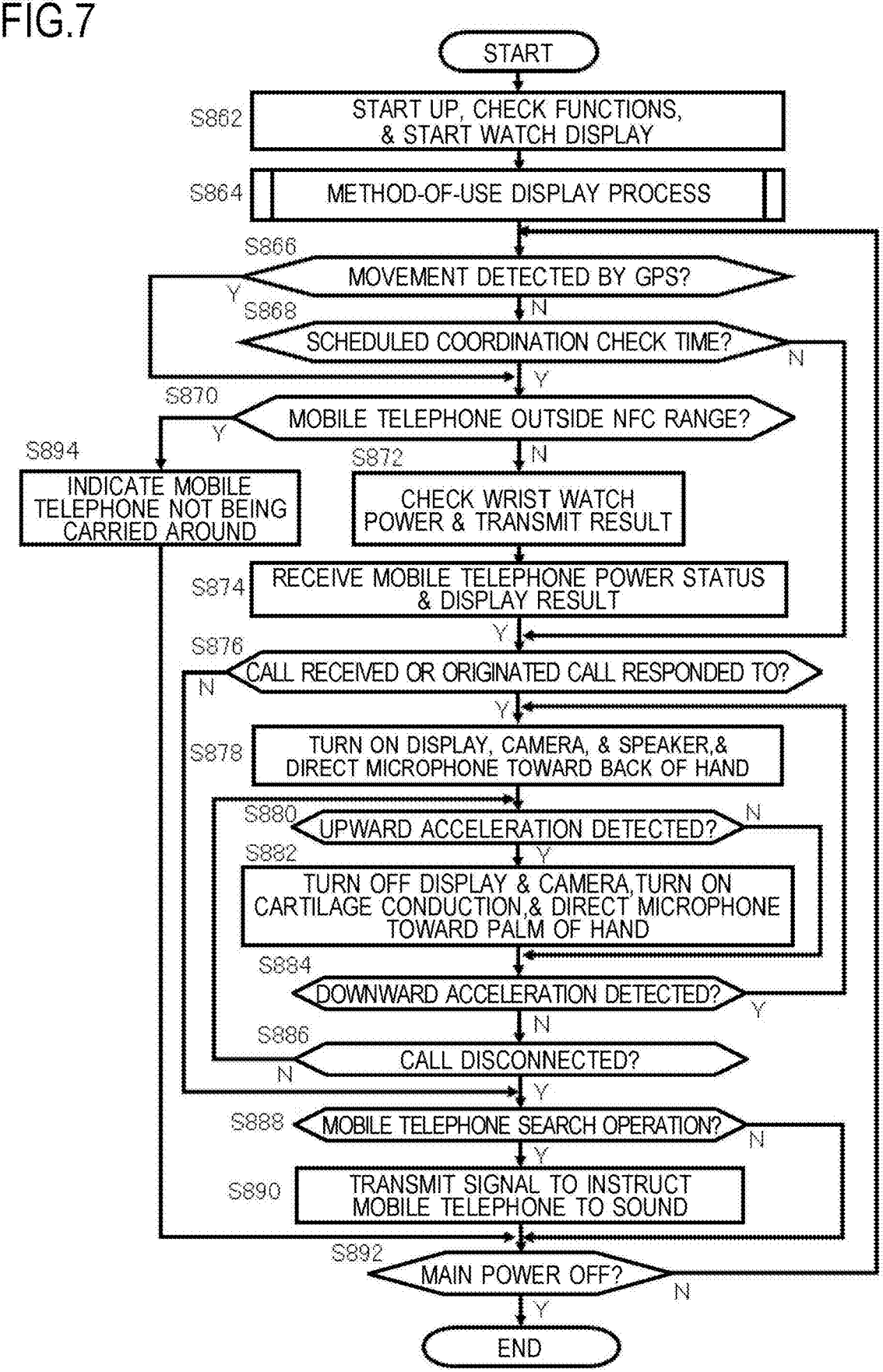
FIG. 7 is a flow chart showing, from another perspective, the function of a wrist watch-type handset in Embodiment 1.

FIG. 7 is a flow chart showing, from another perspective, the function of the controller 98 of the wrist watch-type handset 4 in the Embodiment 1. Here again, the flow in FIG. 7 focuses on operation for functions related to cartilage conduction; in reality, the wrist watch-type handset 4 involves operation of the controller 98 that does not appear in the flow in FIG. 7, such as for ordinary wrist watch functions for instance. FIG. 7 focuses on, among functions related to cartilage conduction, those for controlling the directivity of the variable-directivity microphone 46, for achieving coordination with the mobile telephone 2, and so forth. To avoid complication, the other functions that have been described with reference to FIGS. 1 to 5, and the functions already described with reference to FIG. 6, are also omitted from illustration and description. For convenience' sake, different functions appear separately in FIGS. 6 and 7; in practice, the functions in FIGS. 6 and 7 can be implemented in an integrated manner.

The flow in FIG. 7 starts when the main power of the wrist watch-type handset 4 is turned ON. At Step S862, a start-up procedure is gone through, the functions of relevant blocks are checked, and ordinary watch display on the watch display 30 is started. Next, at Step S864, explanations of different methods of use as shown in FIGS. 2 to 4 are presented in a slide show. On completion of the explanations, the flow proceeds to Step S866, where it is checked whether or not the GPS processor 92 has detected user movement.

If no user movement has been detected, then, at Step S868, it is checked whether or not a scheduled time (e.g., occurring every five seconds) has arrived at which to secure coordination with the mobile telephone 2. If so, the flow proceeds to Step S870. On the other hand, if, at Step S866, the GPS processor 92 has detected user movement, the flow proceeds directly to Step S870. At Step S870, it is checked whether or not the mobile telephone 2 has moved out of the near-field communication range, and if it is inside the near-field communication range, the flow proceeds to Step S872. At Step S872, by near-field communication with the mobile telephone 2, the power status of the wrist watch-type handset 4, which is steadily displayed on the watch display 30, is checked, and the result is transmitted to the mobile telephone 2. The transmitted information is displayed on the mobile telephone 2. Then, at Step S874, information on the power status of the mobile telephone 2 is received by near-field communication, and the result is displayed on the watch display 30, the flow then proceeding to Step S876. On the other hand, if, at Step S868, a scheduled time has not arrived, the flow proceeds directly to Step S876.

At Step S876, it is checked, by near-field communication, whether or not the mobile telephone 2 has received an incoming call, or whether or not a call-originating operation on the operation panel 6509 of the wrist watch-type handset 4 has been responded to by the other side. If either is the case, this means that a call with the other side has been started on the mobile telephone 2, and thus the flow proceeds to Step S878, where the display of the other side's face on the watch display 30, the shooting of the user's own face by the camera 34, and the generation of air-conducted sound by the speaker 32 are all turned ON, and in addition the directivity of the variable-directivity microphone 46 is directed toward the back of the hand, the flow then proceeding to Step S880. At this time, the cartilage conduction vibration sources 36, 38, and 40 are OFF. In this way, a call is started initially in a videophone mode. In the case of a voice-only call instead of a videophone call, out of the operations mentioned above, the display of the other side's face and the turning ON of the camera 34 are omitted.

At Step S880, it is checked whether or not the acceleration sensor 86 has detected upward movement of the wrist watch-type handset 4 from FIG. 2(A) to (B). If so, then, at Step S882, the display of the other side's face on the watch display 30, the shooting of the user's own face by the camera 34, and the generation of air-conducted sound by the speaker 32 are all turned OFF, and instead the cartilage conduction vibration sources 36, 38, and 40 are turned ON. In addition, the directivity of the variable-directivity microphone 46 is directed toward the palm of the hand, and the flow proceeds to Step S884.

At Step S884, it is checked whether or not the acceleration sensor 86 has detected downward movement of the wrist watch-type handset 4 from FIG. 2(B) to (A), and if so, then at Step S878, the videophone mode is restored. On the other hand, if, at Step S884, no downward movement is detected (this state persists so long as a cartilage conduction call continues), the flow proceeds to Step S886, where whether or not the call has been disconnected is checked. If the call has not been disconnected, the flow returns to Step S880. Thereafter, until the call is detected having been disconnected at Step S886, Steps S878 through S886 are repeated, so that switching between a cartilage-conduction call and a videophone call is performed to cope with change in posture. On the other hand, if, at Step S886, the call is detected having been disconnected, the flow proceeds to Step S888. If, at Step S876, no call is detected having been started, the flow proceeds directly to Step S888.

At Step S888, it is checked whether or not a mobile telephone search operation has been made on the operation panel 100. This operation is made, for example, when a user who is about to go out cannot find the mobile telephone 2. When this operation is made, the flow proceeds to Step S890, where, by near-field communication with the mobile telephone 2, an instruction signal is transmitted to the mobile telephone 2 to make it sound a ringtone (or actuate the vibrator), and the flow proceeds to Step S892.

On the other hand, if, at Step S870, the mobile telephone 2 is detected having moved out of the near-field communication range, the flow proceeds to Step S894, where an indication is displayed to warn that the mobile telephone 2 is not being carried around, the flow then proceeding to Step S892. By various means as described above, coordination between the wrist watch-type handset 4 and the mobile telephone 2 is secured.

At Step S892, it is checked whether or not the main power of the wrist watch-type handset 4 has been turned OFF, and if not, the flow returns to Step S866, so that thereafter, until the main power is detected having been turned OFF at Step S892, Steps S866 through S892 are repeated. On the other hand, if, at Step S892, the main power is detected having been turned OFF, the flow ends.

The various features of Embodiment 1 described above can be implemented not only in Embodiment 1 but also in any other embodiment so long as they provide their advantages. Moreover, as will be discussed below by way of some examples, the various features of Embodiment 1 can be implemented with various modifications. Modified features can be implemented in appropriate combinations with each other and with unmodified features.

For example, the vibration of the cartilage conduction vibration sources 38 and 40 conducts, via the conducting segment 41 in the belt 28, also to the part of the belt 28 where the cartilage conduction vibration sources 38 and 40 are not located; thus, in a case where the conducting segment 41 has high conduction efficiency, one of the cartilage conduction vibration sources 38 and 40 may be omitted. A configuration is also possible where the vibration of the cartilage conduction vibration source 36 of the wrist watch body 26 is conducted to the conducting segment 41. This configuration permits delivery of vibration from around the wrist over a large area even with the cartilage conduction vibration sources 38 and 40 both omitted. Conversely, a configuration is also possible where the conducting segment 41 is extended to the reverse side of the wrist watch body 26 so as to conduct to it the vibration of one or both of the cartilage conduction vibration sources 38 and 40. This configuration permits even the cartilage conduction vibration source 36 to be omitted. In this way, so long as vibration for cartilage conduction can be conducted substantially over a large area around the wrist, a smaller number of cartilage conduction vibration sources, or a single cartilage conduction vibration source, will do. Conversely, a larger number of cartilage conduction vibration sources than in Embodiment 1 may be provided to boost the conduction of vibration for cartilage conduction from around the wrist over a large area.

Instead of the switch 44 being displayed on the watch display 30, a button having a similar function may be provided at a position corresponding to the cartilage conduction vibration source 38 or 40 in the belt 28. Also with this design, an action to press the button serves as an action to bring the cartilage conduction vibration source 38 or 40 in close contact with the wrist. The tightening force does not necessarily have to be switched manually in this way; a configuration is also possible where the tightening force is increased automatically when an upward acceleration is detected at Step S16 in FIG. 6. In that case, a brief voice message saying "the belt will be tightened" may be sounded before the speaker 32 is turned OFF at Step S18 so as not to surprise the user. For simplicity's sake, the tightening mechanism may be omitted, in which case the cartilage conduction vibration source 38 or 40 is brought into close contact with the wrist simply by the action of pressing the switch 44. In this case, the switch 44 can be assigned a function of turning ON the vibration of the cartilage conduction vibration sources 38 and 40 for sound conduction. The switch 44 itself may be omitted, in which case guidance can be displayed on the watch display 30 to instruct the user to press somewhere near where the cartilage conduction vibration sources 38 and 40 are located.

Furthermore, Embodiment 1 is configured so as to conduct vibration from around the wrist over as large an area as possible, and so as to absorb differences in the position suitable for vibration conduction among individual users, displacements of the wrist watch-type handset 4 while it is being worn, and so forth. As another, contrastive embodiment, a configuration is also possible where the point of effective vibration conduction is measured for each individual so that vibration concentrates at the optimal position. Even in that case, with consideration given to displacements during use, some margin is allowed for with respect to the conduction area in which to concentrate vibration.

Instead of the variable-directivity microphone 46 in Embodiment 1, a wide-angle microphone may be adopted that can collect sound both from the direction of the back of the hand and from the direction of the palm of the hand.

Embodiment 2

Figure 8:
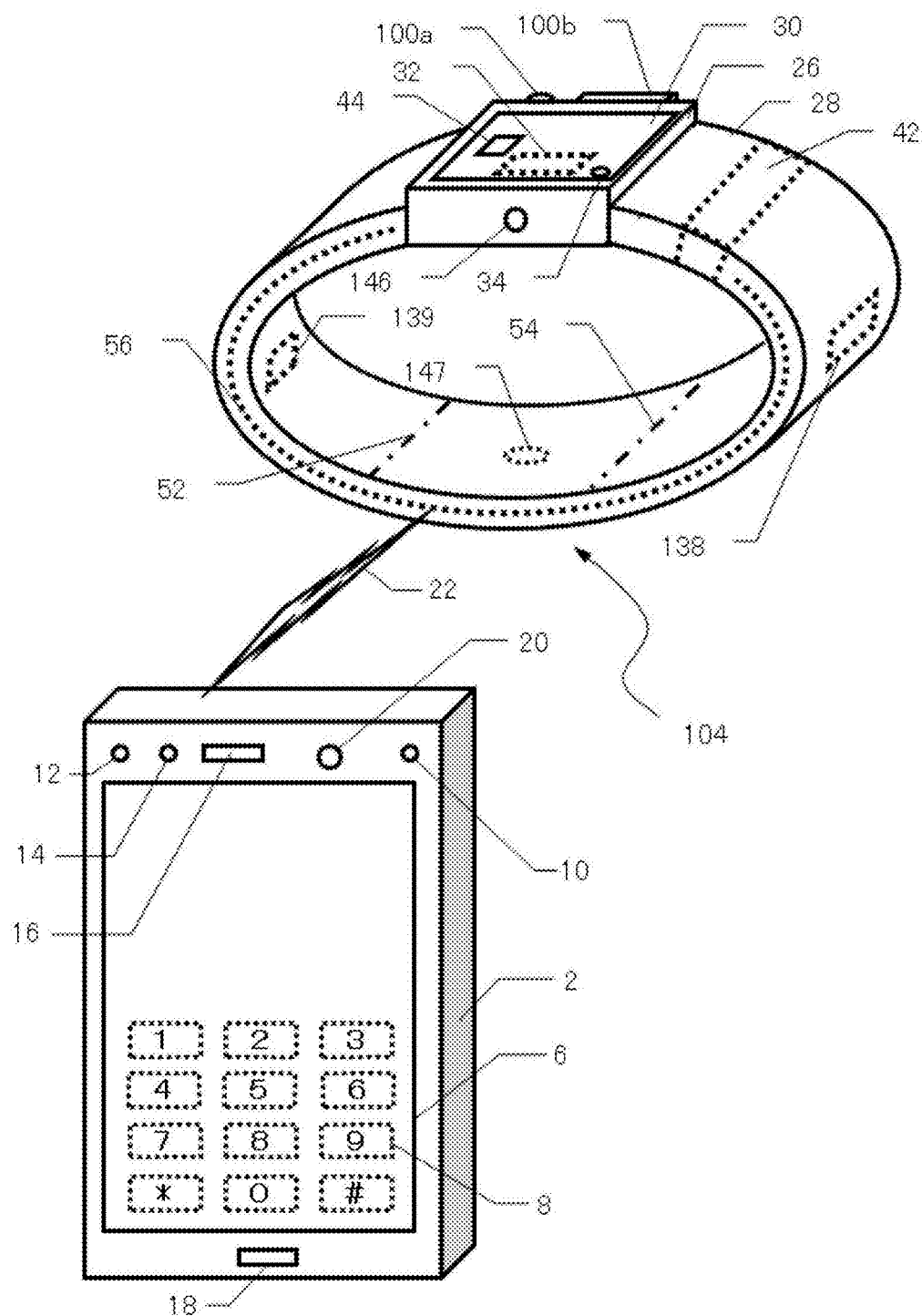
FIG. 8 is a perspective view showing a system configuration of a second embodiment (Embodiment 2) of the present invention.

FIG. 8 is a perspective view showing a system configuration according to another embodiment, Embodiment 2, of the present invention. Embodiment 2 is also configured as a system comprising a mobile telephone 2 and a wrist watch-type handset 104. Embodiment 2 in FIG. 8 has much in common with Embodiment 1 shown in FIG. 1; therefore, common parts are identified by common reference numerals, and no overlapping description will be repeated unless necessary.

Embodiment 2 in FIG. 8 differs from Embodiment 1 in FIG. 1 in that the configuration in which vibration is conducted from the wrist watch-type handset 104 to the wrist is studied in terms of the anatomy of the hand, and in that consideration is given to the relationship between when the wrist watch-type handset 104 is worn on the left arm and when it is worn on the right arm. Consideration is also given to the relationship between the orientation of an operation portion 100 when the wrist watch-type handset 104 is worn and how vibration is conducted.

In FIG. 8, the wrist watch body 26 is provided with a handset speaker 32 and an obverse-side microphone 146 for videophoning, which are used when a videophone call is performed in a posture as shown in FIG. 2(A). On the other hand, on the belt 28 of the wrist watch-type handset 104, there are arranged a first cartilage conduction vibration source 138 which is located near the left-arm radius when the wrist watch-type handset 104 is worn on the left arm in the state in FIG. 8 and a second cartilage conduction vibration source 139 which is located near the right-arm radius when the wrist watch-type handset 104 is worn on the right arm in the state in FIG. 8, which will be described in detail later.

The belt 28 of the wrist watch-type handset 104 is also provided with a reverse-side microphone 147 for speech transmission and reception by cartilage conduction. The combination of the handset speaker 32 and the obverse-side microphone 146 and the combination of the first cartilage conduction vibration source 138 or the second cartilage conduction vibration source 139 and the reverse-side microphone 147 are switched through the operation of the switch 44 so that one of the combinations functions at a time. Switching between the obverse-side microphone 146 and the reverse-side microphone 147 corresponds to switching the directivity of the variable-directivity microphone 46 in Embodiment 1 in FIG. 1.

FIG. 8 also shows a switch 100*a* for turning ON and OFF the main power and a button 100*b* for originating and responding to a call, which constitute the operation portion 100. The wrist watch-type handset 104 is typically designed on the premise that the wrist watch-type handset 104 is worn on the right arm or the left arm with the operation portion 100 pointing to the back of the hand. This is to facilitate the operation of the operation portion 100. However, some users may wear the wrist watch-type handset 104 with the operation portion 100 pointing to the elbow to avoid the back of the hand touching the operation portion 100 when the wrist is bent backward. Embodiment 2 is configured to cope with such a way of wearing.

Figure 9:
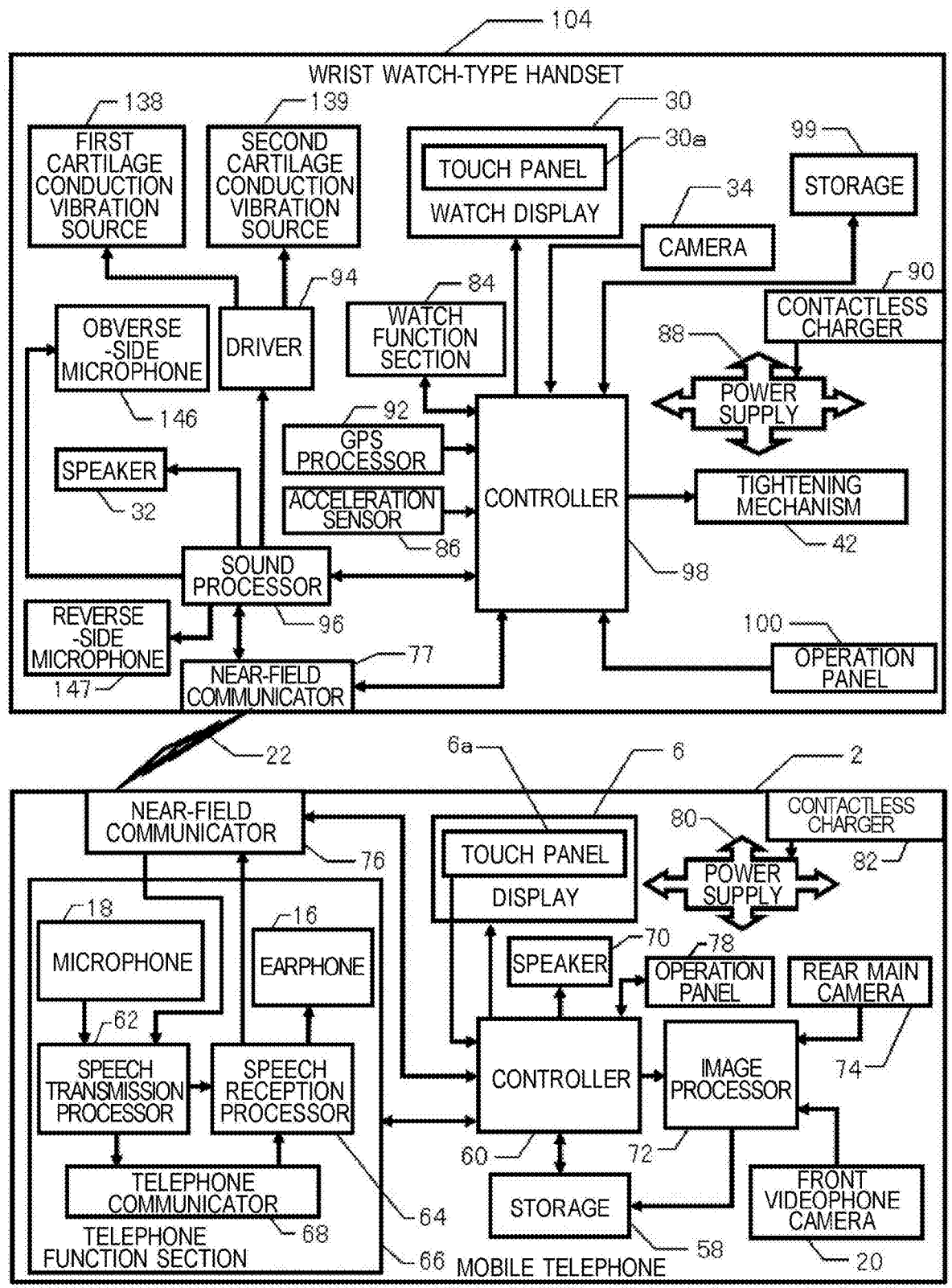
FIG. 9 is a block diagram of Embodiment 2.

FIG. 9 is a block diagram of Embodiment 2 shown in FIG. 8; there, such parts as appear also in FIG. 8 are identified by common reference numerals, and no overlapping description will be repeated unless necessary. The block diagram of Embodiment 2 in FIG. 9 has much in common with the block diagram of Embodiment 2 shown in FIG. 5; therefore, such parts as appear also in FIG. 5 are identified by common reference numerals, and no overlapping description will be repeated unless necessary. FIG. 9 differs from FIG. 5 in the provision of the obverse-side microphone 146 for videophoning, the reverse-side microphone 147 for speech transmission and reception by cartilage conduction, the first cartilage conduction vibration source 138, and the second cartilage conduction vibration source 139. Their configuration and operation will be described in detail later.

Figure 10:
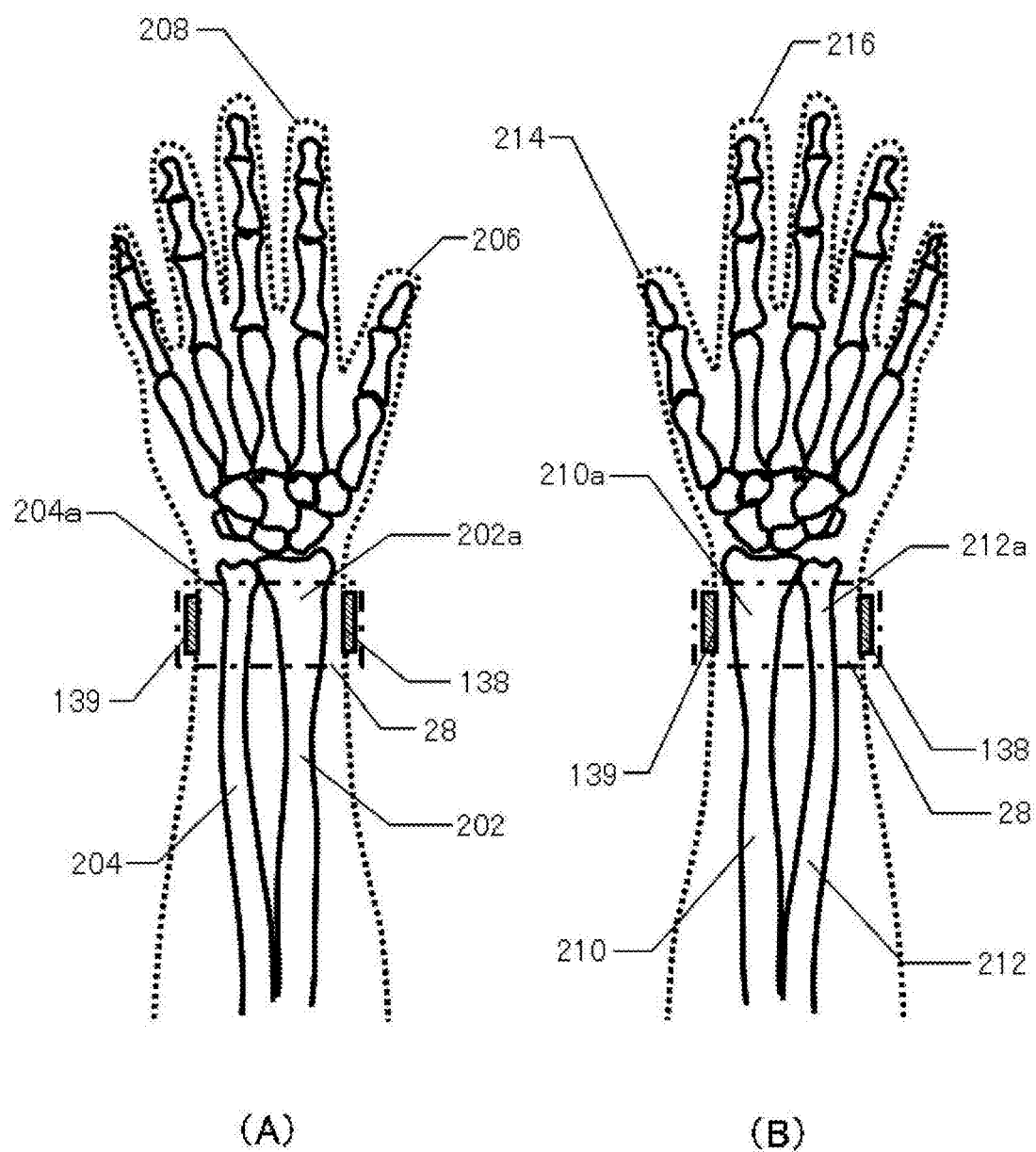
FIG. 10 is a schematic anatomical diagram of the forearms on which a wrist watch-type handset according to Embodiment 2 is worn.

FIG. 10 is a schematic anatomical diagram of the forearms on which the wrist watch-type handset 104 of Embodiment 2 is worn. FIG. 10(A) shows a case where the belt 28 of the wrist watch-type handset 104 is worn on the left arm. The left forearm of a human has a radius 202 and an ulna 204 extending from the elbow to the wrist, and the radius 202 is located closer to the thumb 206. As shown in FIG. 10(A), the first cartilage conduction vibration source 138 is located near a left-arm radius distal end 202*a* when the belt 28 is worn on the left arm. This permits the vibration of the first cartilage conduction vibration source 138 to conduct well to the left-arm radius distal end 202*a*, and, owing to the structure of the bone tissue, the vibration is conducted efficiently to a tip end part of the left-hand thumb 206. Thus, by putting the tip end of the left-hand thumb 206 in contact with an ear cartilage such as a tragus in a posture as shown in FIG. 3(B), cartilage conduction occurs. The vibration conducted from the first cartilage conduction vibration source 138 to the left-arm radius distal end 202*a* is also efficiently conducted to a tip end part of the left-hand forefinger 208, and thus, hearing is suitably achieved also in postures as shown in FIG. 2(B) and FIG. 4(A). The vibration conducted to the left-arm radius distal end 202*a* conducts well to the base of the left-hand thumb 206, and thus, hearing is suitably achieved also in a posture as shown in FIG. 4(B).

In the case of FIG. 10(A), the second cartilage conduction vibration source 139 is located near the left-arm ulna distal end 204*a*. Embodiment 2 is configured to conduct vibration from the first cartilage conduction vibration source 138 to the left-arm radius distal end 202*a*; thus, when the belt 28 of the wrist watch-type handset 104 is worn on the left arm as shown in FIG. 10(A), the vibration of the second cartilage conduction vibration source 139 is stopped.

On the other hand, FIG. 10(B) shows a case where the belt 28 of the wrist watch-type handset 104 is worn on the right arm. Although what is shown there is symmetric left-to-right compared with FIG. 10(A), the right forearm also has a radius 210 and an ulna 212 extending from the elbow to the wrist. As shown in FIG. 10(B), the second cartilage conduction vibration source 139 is located near the right-arm radius distal end 210*a* when the belt 28 is worn on the right arm. This permits the vibration of the second cartilage conduction vibration source 139 to conduct well to the right-arm radius distal end 210*a*, and the vibration is efficiently conducted to a tip end part of the right-hand thumb 214. Thus, as in the case of FIG. 10(A), it is possible to achieve efficient cartilage conduction from the tip end part or the base of the right-hand thumb 214 or from a tip end part of the right-hand forefinger 216. In the case of FIG. 10(B), the first cartilage conduction vibration source 138 is located near the right-arm ulna distal end 212*a*, and thus the vibration of the first cartilage conduction vibration source 138 is stopped.

As described above, it is possible to cope with both a case where the belt 28 of the wrist watch-type handset 104 is worn on the left arm and a case where it is worn on the right arm by providing the belt 28 with two cartilage conduction vibration sources symmetrically left to right such that one of the cartilage conduction vibration sources is located near the radius distal end of the arm on which the wrist watch-type handset 104 is worn.

Figure 11:
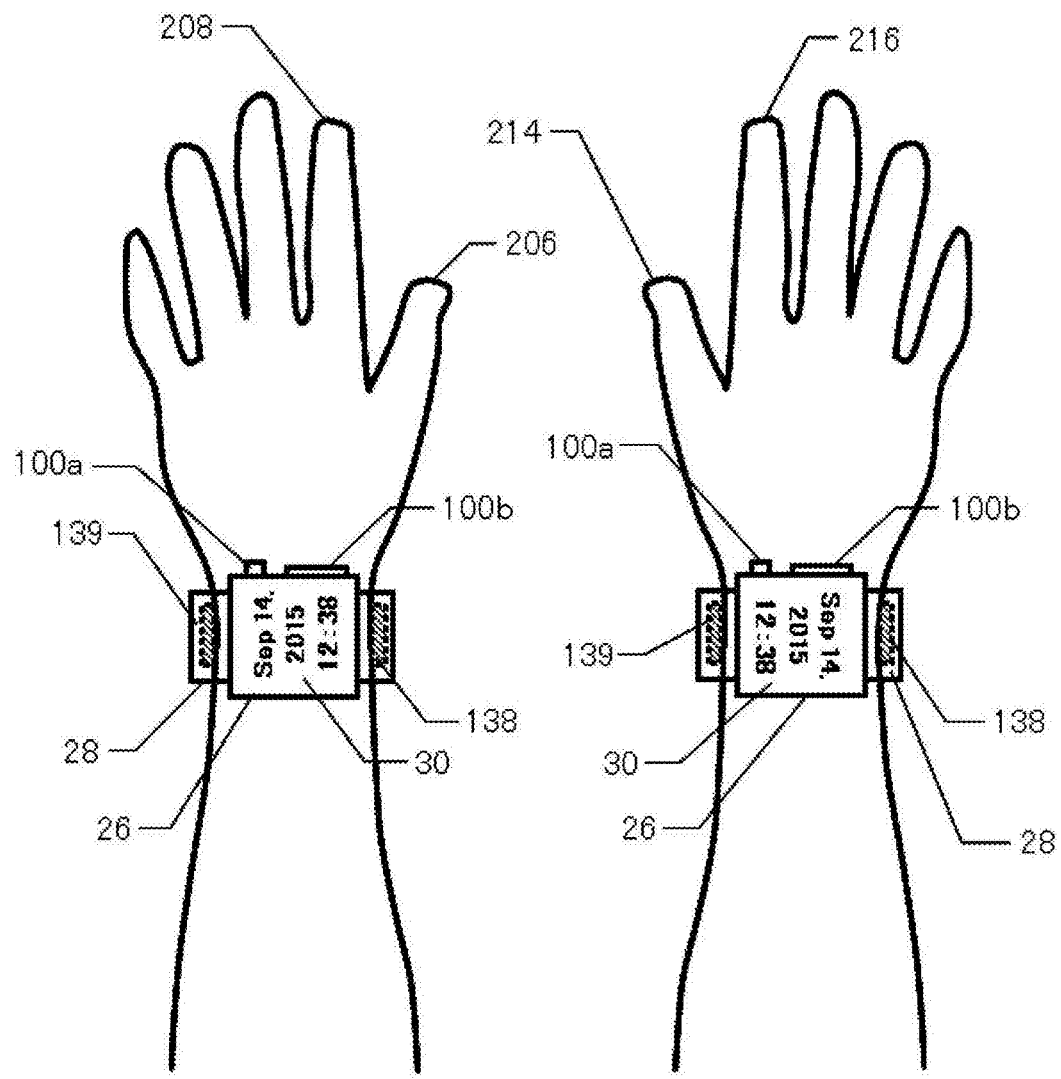
FIG. 11 comprises top views of the forearms on which a wrist watch-type handset according to Embodiment 2 is worn.

FIG. 11 comprises top views of the forearms on which the wrist watch-type handset 104 of Embodiment 2 is worn; there, such parts as appear also in FIG. 10 are identified by common reference numerals, and no overlapping description will be repeated unless necessary. With reference to FIG. 11, a description will be given chiefly of the orientation of the switch 100*a* for turning ON and OFF the main power and the button 100*b* for originating and responding to a call, which constitute the operation portion 100, (hereinafter, referred to as the operation portion 100) and the orientation of the watch display 30 in relation to the cartilage conduction vibration source that is used.

FIG. 11(A) corresponds to FIG. 10(A), thus showing the case where the belt 28 of the wrist watch-type handset 104 is worn on the left arm. Here, the operation portion 100 points to the back of the hand. The watch display 30 of the wrist watch body 26 provides display in an upright state as seen from the left-hand thumb 206 side. As described with reference to FIG. 10(A), the first cartilage conduction vibration source 138 located near the left-arm radius distal end 202*a* is in a vibrating state, while the vibration of the second cartilage conduction vibration source 139 is stopped. The state in FIG. 11(A) will be referred to as a standard state.

By contrast, FIG. 11(B) corresponds to FIG. 10(B), thus showing the case where the belt 28 of the wrist watch-type handset 104 is worn on the right arm. Here also, the belt 28 is worn with the operation portion 100 pointing to the back of the hand. Although the watch display 30 provides display in an upright state as seen from the right-hand thumb 214 side, here, it should be noted that the display of the watch display 30 is rotated through 180 degrees upside down as compared with that in the case of FIG. 11(A). In the case of FIG. 11(B), the second cartilage conduction vibration source 139 located near the right-arm radius distal end 210*a* is in a vibrating state, while the vibration of the first cartilage conduction vibration source 138 is stopped.

Figure 12:
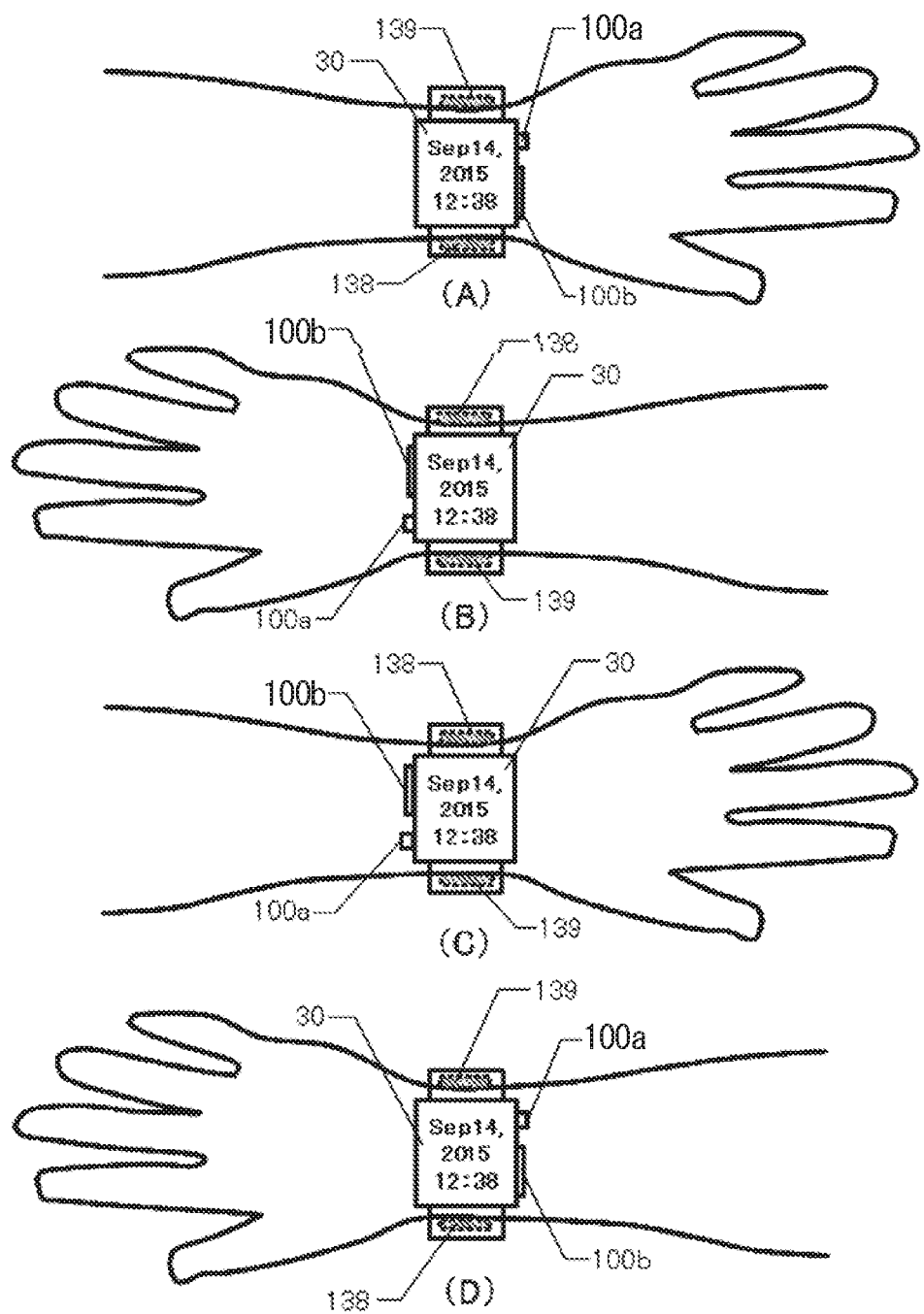
FIG. 12 comprises top views of the forearms showing various worn states as seen from the direction from which a display is viewed.

FIG. 12 comprises top views of the forearms showing various worn states as seen from the direction from which the display of the watch display 30 is viewed; there, such parts as appear also in FIG. 11 are identified by common reference numerals, and no overlapping description will be repeated unless necessary. FIG. 12(A) shows the same worn state as that in FIG. 11(A), rotated 90 degrees clockwise. FIG. 12(B) shows the same worn state as that in FIG. 11(B), rotated 90 degrees counter-clockwise. By contrast, FIG. 12(C) and FIG. 12(D) each show a worn state with the operation portion 100 pointing to the elbow.

Specifically, FIG. 12(C) shows a case where the wrist watch-type handset 104 is worn on the left arm with the operation portion 100 pointing to the elbow. Although the watch display 30 provides display in an upright state as seen from the left-hand thumb 206 side, the display of the watch display 30 is rotated through 180 degrees upside down as compared with that in the standard state in FIG. 12(A). The second cartilage conduction vibration source 139 located near the left-arm radius distal end 202*a* is in a vibrating state, while the vibration of the first cartilage conduction vibration source 138 is stopped.

On the other hand, FIG. 12(D) shows a case where the wrist watch-type handset 104 is worn on the right arm with the operation portion 100 pointing to the elbow. The watch display 30 provides display in an upright state as seen from the right-hand thumb 214 side, but in the same state, in terms of the up-down orientation, as in the standard state in FIG. 12(A). The first cartilage conduction vibration source 138 located near the right-arm radius distal end 210*a* is in a vibrating state, while the vibration of the second cartilage conduction vibration source 139 is stopped. That is, FIG. 12(D) corresponds to a state where the wrist watch-type handset 104 is, while how it is viewed is kept unchanged, worn on the right arm from the right side instead of being worn on the left arm from the left side.

FIG. 13 is a table summarizing, based on the description given with reference to FIG. 12, the relationship among the wearing arm, the orientation of the operation portion 100, the orientation of the display, and the cartilage conduction vibration source used in the various worn states (A), (B), (C), and (D) shown in FIG. 12. The two bottom rows in FIG. 13 show, respectively, the average gravitational acceleration on the operation portion relied on for automatically recognizing the orientation of the operation portion 100 and the most frequently occurring turning acceleration start pattern relied on for automatically recognizing the wearing arm, which will be described later.

FIG. 14 is a diagram illustrating the concept relating to the automatic recognition of the orientation of the operation portion 100 and the wearing arm, showing the worn state on the left arm in FIG. 12(A). FIG. 14(A) shows a state where the arm hangs down, which is a posture supposedly held most frequently in daily life. Here, as shown in FIG. 14(B), the surface of the watch display 30 of the wrist watch body 26 stands substantially vertical with the normal line X pointing rightward while the operation portion 100 points downward (in the direction opposite to the Z-axis). Thus, by acquiring the gravitational acceleration with the acceleration sensor 86, storing the acquired results, and taking their average value, it is possible to recognize a worn state with the operation portion 100 pointing downward (a worn state with it pointing to the back of the hand). Walking or the like produces a centrifugal force that causes the arm to swing about the shoulder, and thus, by acquiring and storing the direction of the centrifugal force with the acceleration sensor 86 and recognizing the direction of the frequently occurring centrifugal force, it is possible to cross-check the worn state with the operation portion 100 pointing to the back of the hand.

FIG. 14(C) shows a state where the watch display 30 is viewed in a posture changed from that in the state in FIG. 14(A). The shift from the state in FIG. 14(A) to the state in FIG. 14(C) is considered more likely to occur after the state in FIG. 14(A) has been held for a relatively long time. The most frequently occurring turning acceleration start pattern in FIG. 13 indicates posture change of this pattern. After the watch display 30 is viewed, the shift from the state in FIG. 14(C) to the state in FIG. 14(A) occurs. In this case, the state in FIG. 14(C) is expected to be held only for a relatively short time; thus, it is possible to extract the shift from the state in FIG. 14(A) to the state in FIG. 14(C) as one distinct from the reverse shift.

Now, a description will be given of the most frequently occurring turning acceleration start pattern of the left arm extracted as described above. FIG. 14(D) shows the orientation of the wrist watch body 26 corresponding to the state where the watch display 30 is viewed as in FIG. 14(C). Here, the surface of the watch display 30 lies substantially horizontal with the normal line X pointing upward, while the operation portion 100 points leftward (in the direction opposite to the Z-axis) in FIG. 14(D). Comparing FIG. 14(D) with FIG. 14(B) reveals that, as the posture is changed from FIG. 14(A) to FIG. 14(C), the direction of the normal line X of the surface of the watch display 30 rotates through about 90 degrees to point upward, and in addition, as will be understood from FIG. 14(D), the watch display 30 is rotated clockwise as indicated by an arrow about the normal line X made to point upward. Such a turning movement is unique to a posture change from FIG. 14(A) to FIG. 14(C). Thus, by detecting such a most frequently occurring turning acceleration start pattern with the acceleration sensor 86, it is possible to recognize that the wrist watch-type handset 104 is worn on the left arm. This turning movement of the left arm is itself detected in the same manner even in the state in FIG. 12(C), which is a worn state with the operation portion 100 pointing to the elbow, thus irrespective of the orientation of the operation portion 100.

FIG. 15 is a diagram, like the one shown in FIG. 14, illustrating the concept relating to the automatic recognition of the orientation of the operation portion 100 and the wearing arm, showing the worn state on the right arm in FIG. 12(B). As in FIG. 14, in the state where the arm hangs down as in FIG. 15(A), based on the gravitational acceleration detected by the acceleration sensor 86, it is possible to recognize a worn state with the operation portion 100 pointing to the back of the hand. Also as in FIG. 14, the worn state with the operation portion 100 pointing to the back of the hand is cross-checked based on the detection of the direction of the centrifugal force by the acceleration sensor 86.

FIG. 15(C) shows, with respect to the right arm, a state where the watch display 30 is viewed in a posture changed from that in the state in FIG. 15(A). Based on this, the most frequently occurring turning acceleration start pattern in the case of the right arm will be described. FIG. 15(D) shows the orientation of the wrist watch body 26 corresponding to the state where the watch display 30 is viewed as in FIG. 15(C). FIG. 15(D) shows a state where the watch display 30 is rotated counter-clockwise as indicated by an arrow about the normal line X of the surface of the watch display 30, which is made to point upward. This turning movement is opposite to that in the case of the left arm in FIG. 14, and is unique to a posture change from FIG. 15(A) to FIG. 15(C). Thus, by detecting such a most frequently occurring turning acceleration start pattern with the acceleration sensor 86, it is possible to recognize that the wrist watch-type handset 104 is worn on the right arm. This turning movement of the right arm is itself detected in the same manner even in the state in FIG. 12(D), which is a worn state with the operation portion 100 pointing to the elbow, thus irrespective of the orientation of the operation portion 100.

As described above, based on the combination of detection of the average gravitational acceleration on the operation portion (or the average gravitational acceleration on the forearm or the cross-check of both) with detection of the most frequently occurring turning acceleration start pattern, it is possible to confirm on which arm, left or right, the wrist watch-type handset 104 is worn as well as the orientation of the operation portion 100, and thus to automatically change the orientation of the display shown in FIG. 13 and automatically choose the cartilage conduction vibration source used.

FIG. 16 is a diagram showing screens, like those shown in FIG. 2 to FIG. 4, displayed on the watch display 30 to explain call-conducting postures. FIG. 16 (A) and FIG. 16 (B) show screens explaining, with respect to the left arm, cases similar to those of FIG. 2(B) and FIG. 3(B) respectively.

Likewise, FIG. 17 is a diagram showing screens displayed on the watch display 30 to explain call-conducting postures. FIG. 17(A) and FIG. 17(B) show screens explaining, with respect to the left arm, cases similar to those of FIG. 4(A) and FIG. 4(B) respectively.

Figure 18:
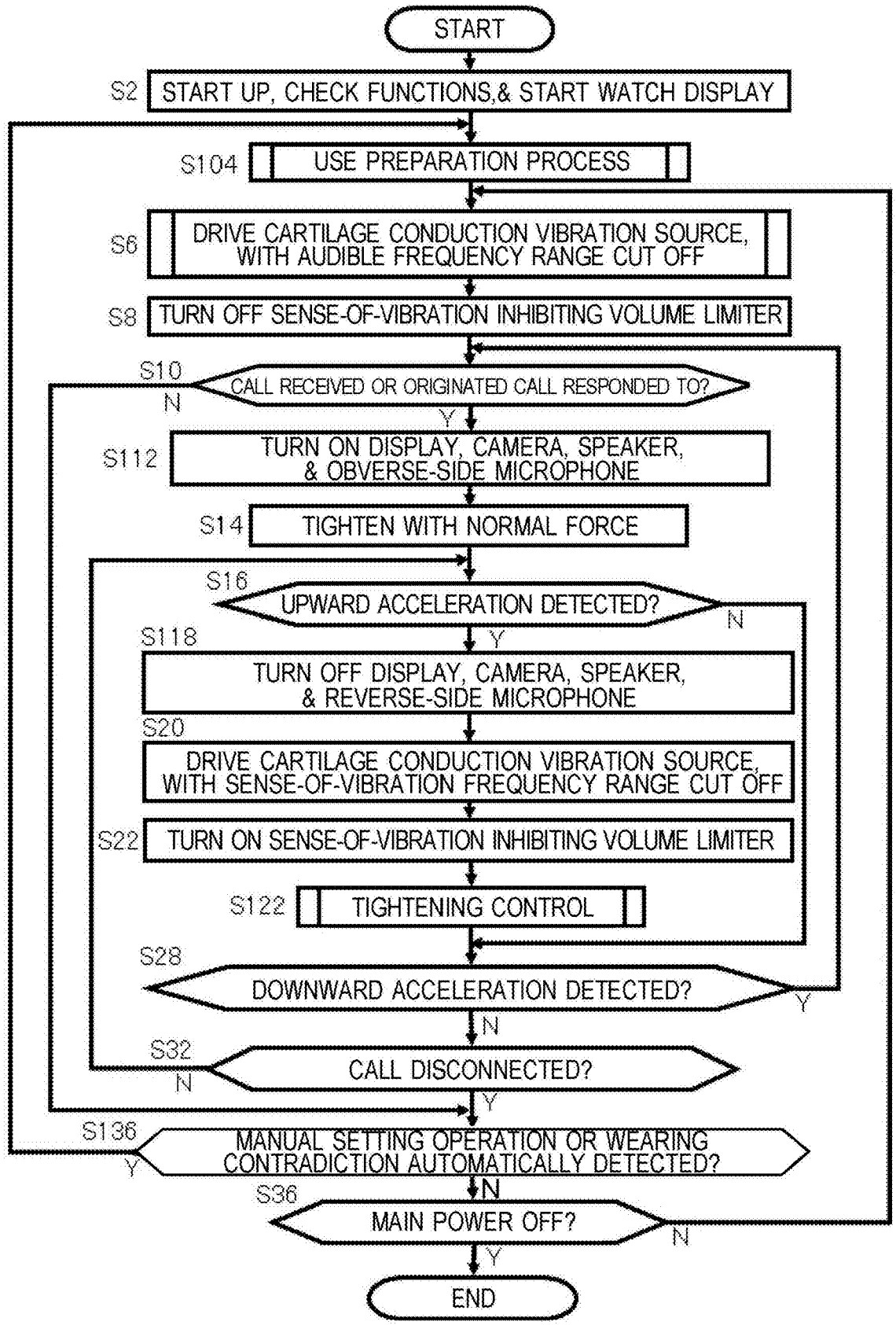
FIG. 18 is a flow chart showing the function of a controller of a wrist watch-type handset according to Embodiment 2.

FIG. 18 is a flow chart showing the function of the controller 98 of the wrist watch-type handset 104 in Embodiment 2. The flow in FIG. 18 has much in common with the flow in Embodiment 1 in FIG. 6; therefore, common steps are identified by the same step numbers, and no overlapping description will be repeated unless necessary.

The flow in FIG. 18 also focuses on operation for functions related to cartilage conduction; in reality, the wrist watch-type handset 104 involves operation of the controller 98 that does not appear in the flow in FIG. 18, such as for ordinary wrist watch functions for instance.

The flow in FIG. 18 starts when the main power of the wrist watch-type handset 104 is turned ON. At Step S2, a start-up procedure is gone through, and the functions of relevant blocks are checked. Next, at Step S104, a use preparation process is performed. This process is a process to cope with the direction of the arm on which the wrist watch-type handset 104 is worn and the orientation of the operation portion 100, and is normally required at the start of use by a particular user. As will be described later, once the orientation of the display and the cartilage conduction vibration source used are determined, these remain fixed unless the settings are expressly changed manually or a contradiction is detected with respect to the previously set wearing condition, so as to be prevented from being erroneously changed frequently. The use preparation process at Step S104 will be described in detail later.

On completion of the use preparation process at Step S104, the flow proceeds to Step S6. Step S112 in FIG. 18 corresponds to Step S12 in FIG. 6, and when, in Embodiment 2, no cartilage conduction is used, the obverse-side microphone 146 is turned ON. On the other hand, Step S118 in FIG. 18 corresponds to Step S18 in FIG. 6, and when, in Embodiment 2, cartilage conduction is used, the reverse-side microphone 147 is turned ON. Step S122 in FIG. 18 includes Steps S24, S26, and S30 in FIG. 6.

When, in FIG. 18, the flow proceeds from Step S10 or Step S32 to Step S136, it is checked whether or not an operation is performed to manually change the orientation of the display and the cartilage conduction vibration source and whether or not a contradiction is automatically detected with respect to the orientation of the display and the cartilage conduction vibration source which have been determined. If so, the flow returns to Step S104, where the use preparation process is performed again. On the other hand, if neither is the case at Step S136, the flow proceeds to Step S36.

Figure 19:
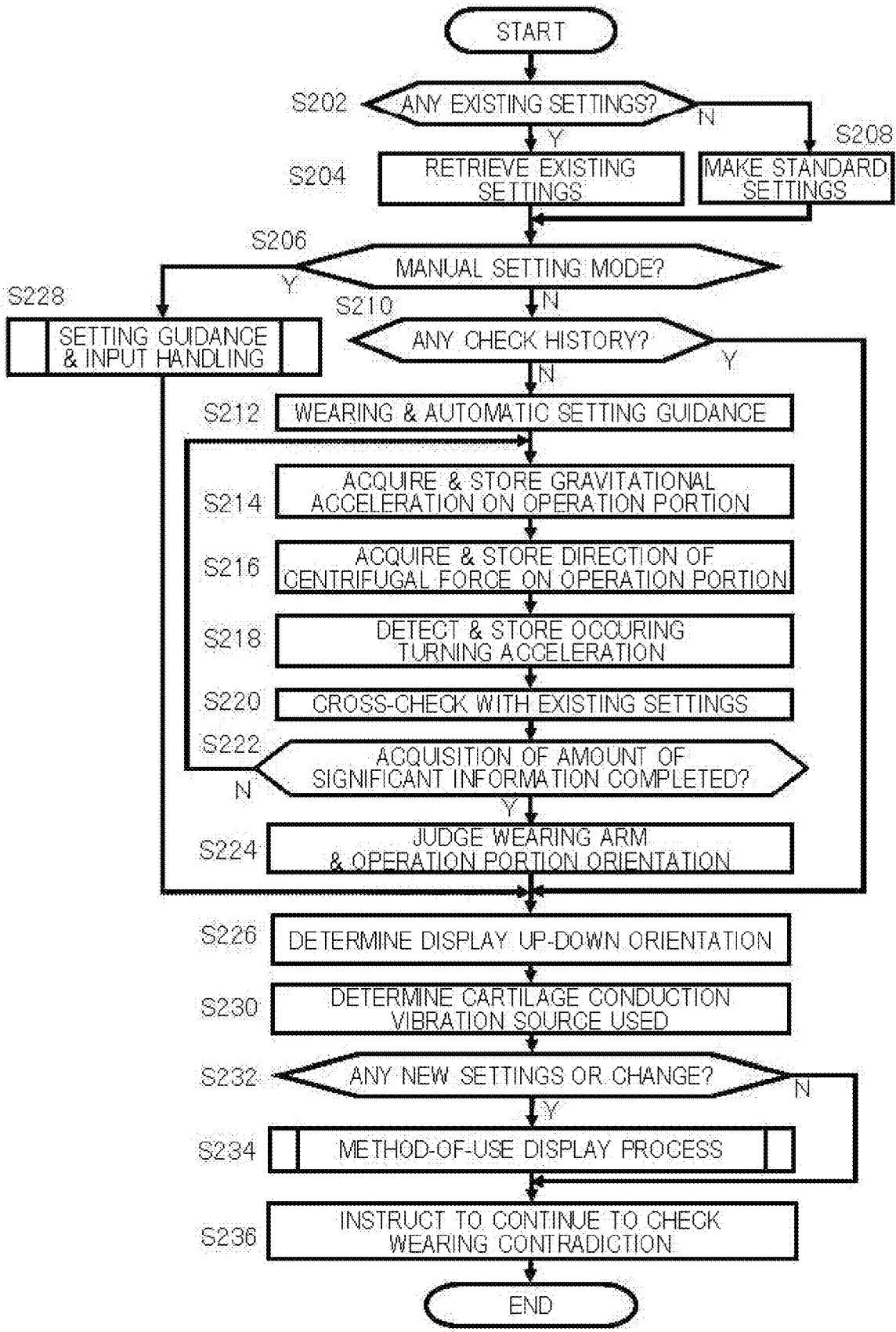
FIG. 19 is a flow chart showing the details of Step S104 in FIG. 18.

FIG. 19 is a flow chart showing the details of the use preparation process at Step S104 in FIG. 18. When the flow starts, at Step S202, whether or not there are existing settings for the orientation of the display and the cartilage conduction vibration source used is checked. If there are existing settings, at Step S204, the content of the existing settings is retrieved, and then the flow proceeds to Step S206. On the other hand, if no existing settings are detected at Step S202, at Step S208, standard settings (the settings in FIG. 12(A)) are made, and then the flow proceeds to Step S206.

At Step S206, it is checked whether or not a mode is active where the orientation of the display and the cartilage conduction vibration source used are set manually. If the manual setting mode is not active, settings are made automatically, and thus the flow proceeds to Step S210, where whether or not there is a check history is checked. At the start of the flow in FIG. 19 (usually on judging whether the wearing arm is the left arm or the right arm and whether the operation portion 100 points to the back of the hand or the elbow, based on which a contradiction has been detected automatically at Step S136 in FIG. 18), there is a check history. When, at Step S210, no check history is detected (usually, corresponding to when the wrist watch-type handset 104 is worn for the first time), the flow proceeds to Step S212 to newly enter an automatic checking procedure.

First, at Step S212, operation guidance is started to guide a user through the automatic recognition. The operation guided through here involves, specifically, lowering the arm on which the wrist watch-type handset 104 is worn for detection of the gravitational acceleration, swinging the arm on which the wrist watch-type handset 104 is worn for detection of the direction of the centrifugal force, and the movements in FIG. 14 (A) to FIG. 14 (C) (or the movements in FIG. 15(A) to FIG. 15(C)) for determination of the wearing arm. These are all natural movements, and are thus not guided about analytically as mentioned above but are guided about simply as routine movements for wearing and viewing. Also they are movements made naturally without being guided about, and thus the guidance does not have to be an instruction but may simply be a message predicting the result, conveying that, in a worn state, the orientation of the display is corrected automatically. It is not particularly necessary to guide a user to choose the cartilage conduction vibration source so long as the one located near the thumb is properly chosen.

As the guidance is started, the flow proceeds, in the course of the guidance, to Step S214, where, by the acceleration sensor 86, the data of the gravitational acceleration on the operation portion is acquired and stored together with the previously acquired data. At Step S216, by the acceleration sensor 86, the data of the direction of the centrifugal force on the operation portion is acquired and stored together with the previously acquired data. Then, at Step S218, by the acceleration sensor 86, the data of the occurring turning acceleration is acquired and stored together with the previously acquired data. Then, at Step S220, new settings determined based on the analysis of the stored results are cross-checked with the existing settings based on Step S204 or Step S208 to examine which settings are reasonable. At Step S222, it is checked whether or not, at Step S214 through Step S222, acquisition of a sufficient amount of significant information to be relied on for determination is complete. If the amount of information is insufficient for reliable determination, the flow returns to Step S214, and thereafter, Step S214 through Step S222 are repeated until it is confirmed that acquisition of an amount of significant information is complete at Step S222. Meanwhile, the guidance started at Step S212 is continued as necessary. On the other hand, if, at Step S222, it is confirmed that acquisition of an amount of significant information is complete, the flow proceeds to Step S224, where the wearing arm and the orientation of the operation portion 100 are judged, the flow then proceeding to Step S226.

On the other hand, if, at Step S210, there is a check history, based on the history, the wearing arm and the orientation of the operation portion 100 are judged, and the flow proceeds to Step S226. If, at Step S206, the manual setting mode is detected, the flow proceeds to Step S228, where guidance on how to make settings manually is given, and a response from a user to the guidance for manual settings is waited for. Then, when, at Step S228, the manual settings are completed, the flow proceeds to Step S226.

At Step S226, the up-down orientation of the display is determined according to the settings made via Step S224, Step S210, or Step S228. At Step S230, the cartilage conduction vibration source used is determined. At these determination steps, the bottom of the display as seen from the direction from which it is viewed always coincides with the chosen cartilage conduction vibration source located near the radius.

Next, the flow proceeds to Step S232, where it is checked whether or not the up-down orientation of the display and the chosen cartilage conduction vibration source are newly set or are changed from the previous settings. Then, if either is the case, the flow proceeds to Step S234, where an usage displaying process is performed, the flow then proceeding to Step S236. On the other hand, if, at Step S232, no new settings are made and the existing settings are unchanged, the flow immediately jumps over the usage displaying process to Step S236 to avoid complication.

At Step S236, an instruction is given to continue to check whether or not there is a wearing contradiction, and the flow ends. The instruction at Step S236 is intended to check for a wearing contradiction on a regular basis while the wrist watch-type handset 104 is being used to cope with the change of a user or the change of the wearing arm or the orientation of the operation portion by the same user for personal reasons. According to the instruction, the controller 98 performs Step S214 through Step S222 in FIG. 19 on a routine basis as necessary to cope with a wearing contradiction, if any. A wearing contradiction refers to, for example, a state where, although the wearing arm has been changed from the state in FIG. 12(A) to the state in FIG. 12(B) and the wrist watch-type handset 104 has been rotated through 180 degrees as seen from the direction from which it is viewed as compared with what is shown in FIG. 12A (note the orientation of the operation portion 100), the watch display 30 remains upside down, and the vibrating cartilage conduction vibration source remains moved near the ulna.

By executing the instruction at Step S236, it is possible to automatically detect a wearing contradiction at Step S136 in FIG. 18; the flow then proceeds to Step S104, and the functions described with reference to FIG. 19 can be carried out.

The various features of the embodiments described above can be implemented not only in those specific embodiments but also in any other embodiment so long as they provide their advantages. Moreover, the various features can be implemented with various modifications and can be implemented in appropriate combinations with the features of the embodiments.

For example, in Embodiment 2, a configuration is also possible where, instead of one of the first cartilage conduction vibration source 138 and the second cartilage conduction vibration source 13 being vibrated selectively, both are vibrated so that, irrespective of which of them is located near the radius, vibration can be conducted to the radius, while the vibration is conducted also from the ulna in a reinforcing manner.

In Embodiment 2, instead of a configuration where switching is possible between the right arm and the left arm, it is possible to offer the wrist watch-type handset 104 in the state shown in FIG. 11(A) as a wrist watch product dedicated to the left hand, and offer, aside from that, the wrist watch-type handset 104 in the state shown in FIG. 11(B) as a wrist watch product dedicated to the right hand, so as to let a user choose which one to purchase.

In Embodiment 2, the cartilage conduction vibration sources can both be vibrated without being switched, while only the up-down orientation of the display is switched. Thus, the configuration in Embodiment 2 where the display is automatically switched upside down is still effective even in a case where switching of the cartilage conduction vibration sources is not performed.

Overview

To follow is an overview of the various embodiments disclosed herein.

According to one embodiment disclosed herein, a wrist watch with a hearing function includes: a display of which the up-down orientation as observed when the display is viewed is reversible; and vibration conducting parts for cartilage conduction provided, respectively, in parts of the wrist watch in contact with near a radius distal end and an ulna distal end when the wrist watch is worn. According to a specific feature, the wrist watch further includes an operation portion provided at a position close to the back of the hand when the wrist watch is worn.

According to another specific feature, the wrist watch further includes: an acceleration detector; a determiner which determines a direction in which the up-down orientation of the display is in an upright state based on the acceleration detected by the acceleration detector; and a display controller which decides the up-down orientation of the display based on a judgement by the determiner and which keeps the up-down orientation unchanged until another judgement against the judgement is made by the determiner. According to a more specific feature, the determiner determines the direction in which the up-down orientation of the display is in the upright state based on a relationship between the up-down orientation of the operation portion and the acceleration detected by the acceleration detector. According to yet another specific feature, the determiner determines whether the operation portion points up or down when the wrist watch is worn based on the average value of the gravitational acceleration detected by the acceleration detector, determines whether the wrist watch is worn on the right arm or the left arm based on the average value of the order and direction in which a turning movement occurs as detected by the acceleration detector, and determines, based on the combination of these, the direction in which the up-down orientation of the display is in the upright state.

According to yet another specific feature, in coordination with reversing of the up-down orientation of the display, whichever of the vibration conducting parts for cartilage conduction is located near the radius distal end is selectively vibrated. According to yet another specific feature, both of the vibration conducting parts for cartilage conduction provided, respectively, in parts of the wrist watch in contact with near the radius distal end and the ulna distal end are vibrated.

According to another feature of one embodiment disclosed herein, a wrist watch with a hearing function includes: a display of which the up-down orientation as observed when the display is viewed is reversible; an acceleration detector; a determiner which determines a direction in which the up-down orientation of the display is in an upright state based on the acceleration detected by the acceleration detector; and a display controller which decides the up-down orientation of the display based on a judgement by the determiner and which keeps the up-down orientation unchanged until another judgement against the judgement is made by the determiner. According to a specific feature, the wrist watch further includes an operation portion located close to the back of the hand when the wrist watch is worn, wherein the determiner determines the direction in which the up-down orientation of the display is in the upright state based on a relationship between the up-down orientation of the operation portion and the acceleration detected by the acceleration detector.

According to another specific feature, the determiner determines whether the operation portion points up or down when the wrist watch is worn based on the average value of the gravitational acceleration detected by the acceleration detector, determines whether the wrist watch is worn on the right arm or the left arm based on the average value of the order and direction in which a turning movement occurs as detected by the acceleration detector, and determines, based on the combination of these, the direction in which the up-down orientation of the display is in the upright state. According to yet another specific feature, the determiner determines whether the operation portion points up or down when the wrist watch is worn based on the average value of the gravitational acceleration detected by the acceleration detector, determines whether the wrist watch is worn on the right arm or the left arm based on the average value of the order and direction in which a turning movement occurs as detected by the acceleration detector, and determines, based on the combination of these, the direction in which the up-down orientation of the display is in the upright state.

According to another feature of one embodiment disclosed herein, a wrist watch with a hearing function dedicated to the left hand and a wrist watch with a hearing function dedicated to the right hand include: a wrist watch dedicated to the left hand of which a display is seen in an upright state and of which an operation portion is located close to the back of the hand when the wrist watch is worn on the left arm; and a wrist watch dedicated to the right hand of which a display is seen in an upright state and of which an operation portion is located close to the back of the hand when the wrist watch is worn on the right arm. The wrist watch dedicated to the right hand and the wrist watch dedicated to the left hand are each provided with a vibration conducting part for cartilage conduction in a part in contact with near a radius distal end when the wrist watch is worn.

According to another feature of one embodiment disclosed herein, a wrist watch with a hearing function dedicated to the right hand includes: a display seen in an upright state when the wrist watch is worn on the right arm; an operation portion located close to the back of the hand when the wrist watch is worn on the right arm; and a cartilage conduction vibration conducting part arranged in a part of the wrist watch in contact with near a radius distal end of the right arm when the wrist watch is worn on the right arm.

INDUSTRIAL APPLICABILITY

The present invention finds application in wrist watches with hearing functions.

LIST OF REFERENCE SIGNS 30 display
202a, 210a radius distal end
204a, 212a ulna distal end
100, 100a, 100b operation portion
86 acceleration detector
98 display controller
98 determiner

The invention claimed is:
1. A wrist watch with a hearing function, comprising:
a display of which an up-down orientation, as observed when the display is viewed, is reversible;
vibration conducting parts for cartilage conduction;
a wrist watch body, wherein the wrist watch body includes the display and has a button, the button being located outside the wrist watch body, away from the display; and
a determiner,
wherein
the wrist watch is operable such that when the wrist watch is worn, one of the vibration conducting parts is located near a radius distal end and another of the vibration conducting parts is located near an ulna distal end,
in coordination with reversing of the up-down orientation of the display, the one of the vibration conducting parts is vibrated and the other of the vibration conducting parts is stopped,
the determiner is operable to determine whether the wrist watch is in a first worn state, in a second worn state, in a third worn state, or in a fourth worn state, wherein:
in the first worn state, the wrist watch is worn on a left arm with the button pointing to a back of a left hand,
in the second worn state, the wrist watch is worn on a right arm with the button pointing to a back of a right hand,
in the third worn state, the wrist watch is worn on the left arm with the button pointing to a left elbow,
in the fourth worn state, the wrist watch is worn on the right arm with the button pointing to a right elbow, and
the determiner is operable to determine a direction in which the up-down orientation of the display is in an upright state based on whether the wrist watch is in the first worn state, in the second worn state, in the third worn state, or in the fourth worn state.
2. The wrist watch of claim 1, further comprising:
an acceleration detector; and
a display controller operable to decide the up-down orientation of the display based on a judgement by the determiner and operable to keep the up-down orientation unchanged until another judgement against the judgement is made by the determiner,
wherein the determiner is operable to determine the direction in which the up-down orientation of the display is in the upright state based on acceleration detected by the acceleration detector.
3. The wrist watch of claim 2, wherein the determiner is operable to determine the direction in which the up-down orientation of the display is in the upright state based on a relationship between an up-down orientation of the button and the acceleration detected by the acceleration detector.
4. The wrist watch of claim 3, wherein the determiner is operable to:
determine whether the button points up or down when the wrist watch is worn based on an average value of gravitational acceleration detected by the acceleration detector,
determines whether the wrist watch is worn on a right arm or a left arm based on an average value of order and a direction in which a turning movement occurs as detected by the acceleration detector, and
determine, based on a combination thereof, the direction in which the up-down orientation of the display is in the upright state.
5. The wrist watch of claim 1, further comprising:
a near-field communication unit for communication with a mobile telephone, wherein
the wrist watch operates as a mobile telephone handset in coordination with the mobile telephone.

* * * * *